US012177092B2

(12) United States Patent
Adriaanse et al.

(10) Patent No.: US 12,177,092 B2
(45) Date of Patent: Dec. 24, 2024

(54) AI DRIVEN 5G NETWORK AND SERVICE MANAGEMENT SOLUTION

(71) Applicant: DISH Wireless L.L.C., Englewood, CO (US)

(72) Inventors: Laurens Johannes Adriaanse, Centennial, CO (US); Robyn Skyler-Lott Casias, Morrison, CO (US); Bassem Abi-Farah, Littleton, CO (US); Vaibhav Singh Rajput, Parker, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 55 days.

(21) Appl. No.: 18/079,768

(22) Filed: Dec. 12, 2022

(65) Prior Publication Data
US 2024/0195708 A1    Jun. 13, 2024

(51) Int. Cl.
*H04L 41/5009* (2022.01)
*H04L 41/16* (2022.01)
*H04L 41/5025* (2022.01)

(52) U.S. Cl.
CPC .......... *H04L 41/5009* (2013.01); *H04L 41/16* (2013.01); *H04L 41/5025* (2013.01)

(58) Field of Classification Search
CPC .. H04L 41/16; H04L 41/5009; H04L 41/5025
See application file for complete search history.

(56) References Cited

U.S. PATENT DOCUMENTS

| 9,164,159 B2 | 10/2015 | Nath et al. |
| 9,781,685 B2 | 10/2017 | Tsui et al. |
| 10,178,646 B2 | 1/2019 | Bosch et al. |
| 10,230,571 B2 | 3/2019 | Rangasamy et al. |
| 10,278,123 B2 | 4/2019 | Wang et al. |
| 10,452,372 B2 | 10/2019 | Lundberg et al. |

(Continued)

FOREIGN PATENT DOCUMENTS

EP    3 869 847 A1    8/2021

OTHER PUBLICATIONS

Bega et al. "Network Slicing Meets Artificial Intelligence: An AI-Based Framework for Slice Management", IEEE Commn's Magazine, vol. 58, Iss. 6, Jun. 2020. DOI: 10.1109/MCOM.001.1900653. (Year: 2020).*

(Continued)

*Primary Examiner* — Lesa M Kennedy
(74) *Attorney, Agent, or Firm* — Seed IP Law Group LLP

(57) ABSTRACT

Methods and apparatuses for improving wireless network performance and efficiency by dynamically configuring network selection and session management functions within a wireless networking environment are described. In some cases, a network and service management system within the wireless networking environment may perform adjustments to the configuration of network slices and protocol data unit (PDU) sessions associated with user equipment (UE) devices utilizing network services provided by the wireless networking environment. The network and service management system may utilize machine learning techniques to provide real-time selection and reconfiguration of network slices and PDU sessions running within the wireless networking environment.

19 Claims, 13 Drawing Sheets

(56) References Cited

U.S. PATENT DOCUMENTS

| | | | |
|---|---|---|---|
| 10,484,892 B2 | 11/2019 | Bellamkonda et al. |
| 10,499,276 B2 | 12/2019 | Chan et al. |
| 10,499,376 B2 | 12/2019 | Kim |
| 10,656,929 B2 | 5/2020 | Jamjoom et al. |
| 10,716,096 B2 | 7/2020 | Yu et al. |
| 10,750,371 B2 | 8/2020 | Bogineni et al. |
| 10,812,377 B2 | 10/2020 | Stammers et al. |
| 10,886,976 B2 | 1/2021 | Rajagopal et al. |
| 10,904,038 B1 | 1/2021 | Haque |
| 10,944,668 B2 | 3/2021 | Rajagopal et al. |
| 10,965,522 B2 | 3/2021 | Yao et al. |
| 10,986,540 B2 | 4/2021 | Bor Yaliniz et al. |
| 11,019,159 B2 | 5/2021 | Lawson et al. |
| 11,128,985 B2 | 9/2021 | Edge et al. |
| 11,153,271 B2 | 10/2021 | Yang et al. |
| 11,223,994 B2 | 1/2022 | Yang et al. |
| 11,228,621 B2 | 1/2022 | Sharma et al. |
| 11,240,063 B2 | 2/2022 | Liu et al. |
| 11,284,297 B2 | 3/2022 | Barton et al. |
| 2002/0170053 A1 | 11/2002 | Peterka et al. |
| 2015/0109976 A1 | 4/2015 | Zhang et al. |
| 2017/0079059 A1 | 3/2017 | Li et al. |
| 2017/0141973 A1 | 5/2017 | Vrzic |
| 2018/0049015 A1 | 2/2018 | Gupta et al. |
| 2018/0307514 A1 | 10/2018 | Koutyrine et al. |
| 2019/0042878 A1 | 2/2019 | Sheller et al. |
| 2019/0220703 A1 | 7/2019 | Prakash et al. |
| 2019/0253907 A1 | 8/2019 | Yao et al. |
| 2019/0289497 A1 | 9/2019 | Rajagopal |
| 2019/0306923 A1 | 10/2019 | Xiong et al. |
| 2019/0349429 A1 | 11/2019 | Jain et al. |
| 2020/0050494 A1 | 2/2020 | Bartfai-Walcott et al. |
| 2020/0106536 A1 | 4/2020 | Bedekar |
| 2020/0125389 A1 | 4/2020 | Palermo et al. |
| 2020/0195495 A1 | 6/2020 | Parker et al. |
| 2020/0329381 A1 | 10/2020 | Chou et al. |
| 2021/0014912 A1 | 1/2021 | Song et al. |
| 2021/0112565 A1 | 4/2021 | Bhaskaran et al. |
| 2021/0144517 A1 | 5/2021 | Guim Bernat et al. |
| 2021/0144613 A1 | 5/2021 | Colom Ikuno et al. |
| 2021/0194821 A1 | 6/2021 | Guim Bernat et al. |
| 2021/0204162 A1 | 7/2021 | Chunduri et al. |
| 2021/0242893 A1 | 8/2021 | Goodman et al. |
| 2021/0258231 A1 | 8/2021 | Venkataramu et al. |
| 2021/0258836 A1 | 8/2021 | Faccin et al. |
| 2021/0306874 A1 | 9/2021 | Bedekar |
| 2021/0314842 A1 | 10/2021 | Padlikar et al. |
| 2021/0368383 A1* | 11/2021 | Jangid ............... H04W 28/0289 |
| 2021/0377116 A1 | 12/2021 | Yeh et al. |
| 2022/0035650 A1 | 2/2022 | Banerjee et al. |
| 2022/0070734 A1 | 3/2022 | Rajagopal |
| 2022/0182293 A1 | 6/2022 | Mishra et al. |
| 2022/0191737 A1* | 6/2022 | Mindler ............ H04W 28/0268 |
| 2022/0210012 A1 | 6/2022 | Stockert et al. |
| 2022/0272786 A1 | 8/2022 | Bansal et al. |
| 2022/0321647 A1 | 10/2022 | Berggren et al. |
| 2023/0246676 A1* | 8/2023 | Reeves ................. H04B 7/043 375/262 |
| 2023/0421472 A1* | 12/2023 | Mathew ............... H04L 47/125 |

OTHER PUBLICATIONS

"5G Network Evolution with AWS," Amazon Web Services, Inc., https://dl.awsstatic.com/whitepapers/5g-network-evolution-with-aws.pdf, Jul. 2020, 48 pages.

"Deploying E2E 5G Network with AWS," Amazon Web Services, Inc., https://d1.awsstatic.com/architecture-diagrams/ArchitectureDiagrams/5g-with-aws-ra.pdf?did=wp_card&trk=wp_card, 2020, 1 page.

"Promoting the Deployment of 5G Open Radio Access Networks," 5G Americas, Nov. 2020, 60 pages.

"Continuous Integration and Continuous Delivery for 5G Networks on AWS," Amazon Web Services, Inc., https://docs.aws.amazon.com/whitepapers/latest/cicd_for_5g_networks_on_aws/cicd_for_5g_networks_on_aws.html, Mar. 8, 2021, 31 pages.

"Cloud Automation for 5G Network," Amazon Web Services, Inc., https://d1.awsstatic.com/whitepapers/cloud-automation-for-5g-network.pdf, Jun. 16, 2021, 22 pages.

Bye et al., "Reinventing cloud-native 5G networks," Amazon Web Services, Inc., https://www.fcc.gov/file/21588/download, 2021, 11 pages.

"Next-Generation Mobile Private Networks Powered by AWS," Amazon Web Services, Inc., https://docs.aws.amazon.com/whitepapers/latest/mobile-private-networks/mobile-private-network-components.html, Jan. 27, 2021, 29 pages.

"DISH lays the foundation for 5G network security," Dish Wireless, https://mma.prnewswire.com/media/1483423/Security_Whitepaper_CLEAN.pdf?p=original, Apr. 8, 2021, 12 pages.

"Future of the Connected Vehicle," Dish Wireless, https://www.dishwireless.com/content/dam/pdfs/wi-whitepaper-connectedcar.pdf, Jan. 6, 2022, 22 pages.

Maule et al., "Real-time Dynamic Network Slicing for the 5G Radio Access Network," Iquadrat Informatica S.L., https://ieeexplore.ieee.org/document/9013965, Dec. 9-13, 2019, 6 pages.

"Amazon EC2 Overview and Networking Introduction for Telecom Companies," Amazon Web Services, Inc., https://dl.awsstatic.com/whitepapers/amazon-ec2-networking-for-telecom.pdf, Sep. 2019, 27 pages.

* cited by examiner

AI DRIVEN 5G NETWORK AND SERVICE MANAGEMENT SOLUTION

BACKGROUND

Next generation wireless networks have the promise to provide higher throughput, lower latency, and higher availability compared with previous wireless communication standards. For fifth generation (5G) wireless networks, a combination of control and user plane separation (CUPS) and multi-access edge computing (MEC), which allows compute and storage resources to be moved from a centralized cloud location to the "edge" of a network and closer to end user devices and equipment, has enabled low-latency applications with millisecond response times. 5G wireless user equipment (UE) may communicate over both a lower frequency sub-6 GHz band between 410 MHz and 7125 MHz and a higher frequency mmWave band between 24.25 GHz and 52.6 GHz. In general, although lower frequencies may provide a lower maximum bandwidth and lower data rates than higher frequencies, lower frequencies may provide higher spectral efficiency and greater range. Thus, there is a tradeoff between coverage and speed. For example, although the mmWave spectrum may provide higher data rates, the millimeter waves may not penetrate through objects, such as walls, and may have a more limited range.

BRIEF SUMMARY

Systems and methods for improving wireless network performance and efficiency via the dynamic configuration of network selection and session management functions within a wireless networking environment are provided. In some cases, a network and service management system may periodically update network selection and session management functions used for implementing network slices based on user device measurements and performance indicators and/or network measurements and performance indicators for the wireless networking environment. The network and service management system may perform periodic adjustments to the configuration of network slices and protocol data unit (PDU) sessions provided by the wireless networking environment. The network and service management system may utilize machine learning techniques to provide real-time selection and reconfiguration of network slices and PDU sessions implemented by the wireless networking environment.

According to some embodiments, the technical benefits of the systems and methods disclosed herein include increased performance and throughput for network slices, improved system performance, and reduced system power and energy consumption when implementing network slices.

BRIEF DESCRIPTION OF THE DRAWINGS

Like-numbered elements may refer to common components in the different figures.

DETAILED DESCRIPTION

Figure 1A:
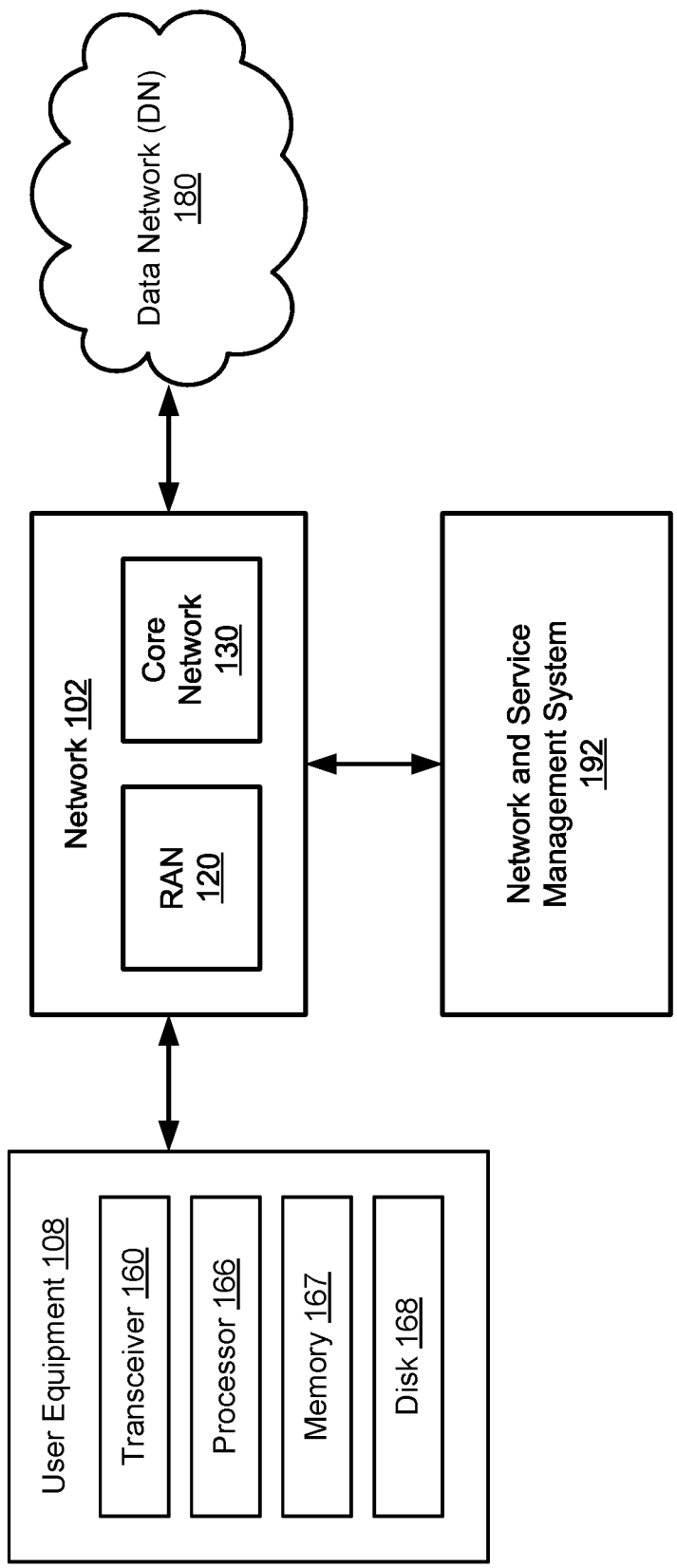
FIG. 1A depicts one embodiment of a wireless networking environment including user equipment that is communicating with a data network via a wireless network.

Technology is described for improving wireless network performance and efficiency by dynamically configuring network selection and session management functions within a wireless networking environment. A network and service management system within the wireless networking environment may perform periodic adjustments to the configuration of network slices and protocol data unit (PDU) sessions associated with user equipment (UE) devices utilizing network services provided by the wireless networking environment. A network slice may be associated with one or more PDU sessions. A PDU session may represent an end-to-end connection from a UE device to another UE device via the wireless networking environment or from a UE device to a data network accessed via the wireless networking environment.

The network and service management system may utilize machine learning techniques to provide real-time selection and reconfiguration of network slices and PDU sessions running within the wireless networking environment. The wireless networking environment may comprise a 5G wireless network or a sixth generation (6G) wireless network. The network and service management system may periodically collect user device data and network data associated with UE devices utilizing network services (e.g., cellular voice or text messaging services). The user device data may be collected from UE devices and may include user device location tracking data, signal strength historical data, and traffic and mobility patterns data. The network data may be collected from network infrastructure resources and may include network performance data and link utilization data. The user device data and network data may be stored within a collector database.

Over time, the network and service management system may continuously monitor key performance indicators (KPIs) for a set of network slices providing a network service, detect that the KPIs for the set of network slices have not satisfied service level agreement (SLA) requirements for the set of network slices, apply one or more machine learning models (e.g., a deep learning model) to identify a second set of network slices to provide the network service, and output instructions to one or more core network functions to replace the set of network slices with the second set of network slices to provide the network services. As examples, a KPI for a network slice may comprise a slice throughput for the network slice, an average download throughput for the network slice, a service uptime as a percentage of overall time for the network slice, or an average end-to-end latency for the network slice. In some cases, upon detection that the KPIs for the set of network slices have not satisfied SLA requirements for the set of network slices, the network and service management system may cause the set of network slices to be reconfigured (e.g., reducing the number of shared core network functions used by the set of network slices) or increase a priority level for each network slice of the set of network slices.

In some embodiments, the network and service management system may periodically collect user device measurements and performance indicators from UE devices connected to a wireless network and collect network measurements and performance indicators from a network infrastructure layer of the wireless network. The network and service management system may interface with a network function layer of the wireless network to dynamically reconfigure network slices over time such that network slices for UE devices connected to the wireless network meet SLA requirements and the wireless network itself is optimized for efficiency, latency, capacity, reliability, and/or availability. In one example, the network and service management system may interface with a policy control function (PCF) to adjust traffic policies and interface with a network slice selection function (NSSF) to instantiate or reconfigure network slices.

The network and service management system may utilize the user device measurements and performance indicators and the network measurements and performance indicators to generate one or more machine learning models for detecting anomalies in expected UE device behavior and/or for detecting anomalies in network conditions. The network and service management system may detect a localized network anomaly (e.g., a power outage affecting the execution of network slices) or detect a user device behavior anomaly (e.g., that the user device has physically moved into a new geographical location at least a threshold distance away from historical location patterns or that the user device has attempted to connect to a new radio access network) using the one or more machine learning models. Upon detection of an anomaly in a network condition or in UE device behavior, the network and service management system may adjust priority levels (e.g., increase priority levels) assigned to network slices impacted by the detected anomaly.

In some cases, the network and service management system may dynamically adjust a priority level assigned to a network slice or to a PDU session over time. When SLA requirements are not being satisfied for a particular network slice, the priority level for the particular network slice may be increased such that data traffic for the particular network slice obtains an elevated priority. When SLA requirements are being satisfied for the particular network slice (e.g., after a network congestion event has passed), then the priority level for the particular network slice may be decreased in order to conserve network resources (e.g., to reduce the power and energy of hardware resources implementing the particular network slice). The network and service management system may acquire or determine the SLA requirements from subscriber data and/or user profiles associated with a UE device. In one example, the subscriber data and user profiles may be acquired from a unified data management (UDM) function running within a wireless networking environment.

Technical benefits of dynamically configuring network selection and session management functions associated with network slices that provide network services to UE devices within a wireless networking environment include an improved utilization of wireless network resources and a reduction in the system power and energy consumed by network infrastructure resources (e.g., by hardware processor and memory resources used to implement and support the network slices). Moreover, scaling network resources to reduce the overprovisioning of network functions may also reduce the power and energy consumed by the network infrastructure resources within the wireless networking environment while satisfying SLA requirements for the network slices.

FIG. 1A depicts one embodiment of a wireless networking environment including user equipment (UE) 108 that is communicating with a data network (DN) 180 via a wireless network 102. In one example, the wireless network 102 may comprise a 5G wireless network or a 6G wireless network. The data network 180 may comprise portions of the Internet, a local area network (LAN), a wide area network (WAN), a private data network, a wireless network, a wired network, or a combination of networks. The DN 180 may comprise a voice and data network. The UE 108 may comprise an electronic device with wireless connectivity or cellular communication capability, such as a mobile phone or handheld computing device. The UE 108 may comprise a mobile computing device (e.g., a smartphone) or a non-mobile computing device (e.g., a desktop computer). The network 102 includes a radio access network 120 and a core network 130.

As depicted in FIG. 1A, the UE 108 includes a transceiver 160, a processor 166, a memory 167, and a disk 168 all in communication with each other. Processor 166 allows the UE 108 to execute computer readable instructions stored in memory 167. Processor 166 may include one or more processing units, such as one or more CPUs and/or one or more GPUs. Memory 167 may comprise one or more types of memory (e.g., RAM, SRAM, DRAM, ROM, EEPROM, or Flash). Memory 167 may comprise a hardware storage device or a semiconductor memory. The transceiver 160 may comprise wireless transmitter/receiver circuitry for transmitting and receiving wireless signals. The UE 108 may include wireless circuitry that provides radio frequency (RF) connectivity between the UE 108 and the wireless network 102. The wireless circuitry may include a baseband processor and RF analog front-end circuitry.

A wireless device that has the ability to connect to multiple wireless networks simultaneously using different subscriber identities may be referred to as a "multiple-SIM, multiple-active" (MSMA) wireless device. In some embodiments, the UE 108 may comprise a MSMA wireless device. In other embodiments, the UE 108 may comprise a single transmitter and one or more receivers. The UE 108 may register with a plurality of different wireless networks including network 102.

Figure 2A:
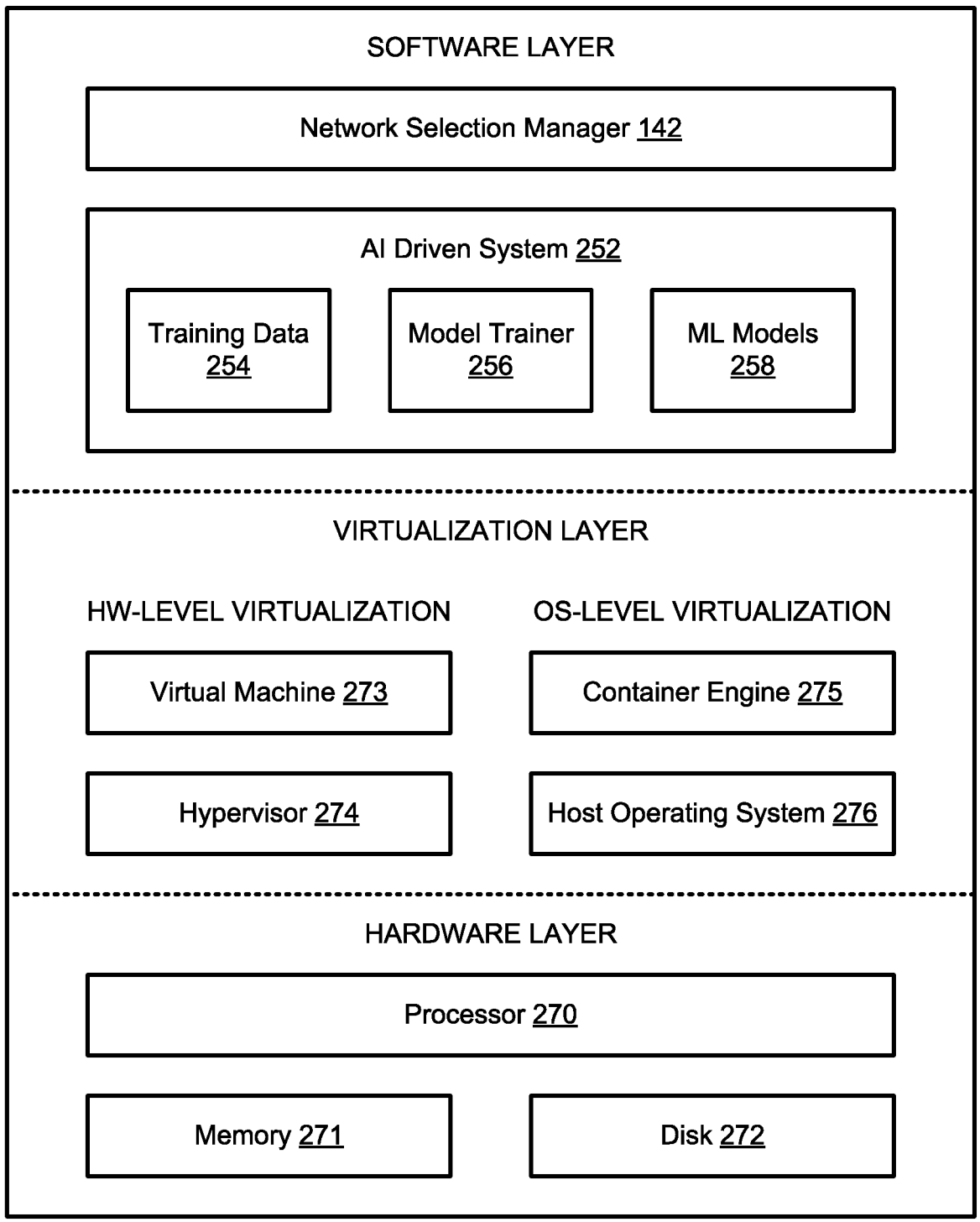
FIG. 2A depicts one embodiment of a network and service management system.

As depicted in FIG. 1A, the network and service management system 192 may interact with various components and functions implemented by the network 102. For example, the network and service management system may perform adjustments to the configuration of network slices and protocol data unit (PDU) sessions associated with user equipment (UE) devices utilizing network services provided by the network 102. The network and service management system 192 may reside within the network 102 or exist outside of the network 102. One example of a network and service management system 192 is depicted in FIG. 2A.

Figure 1B:
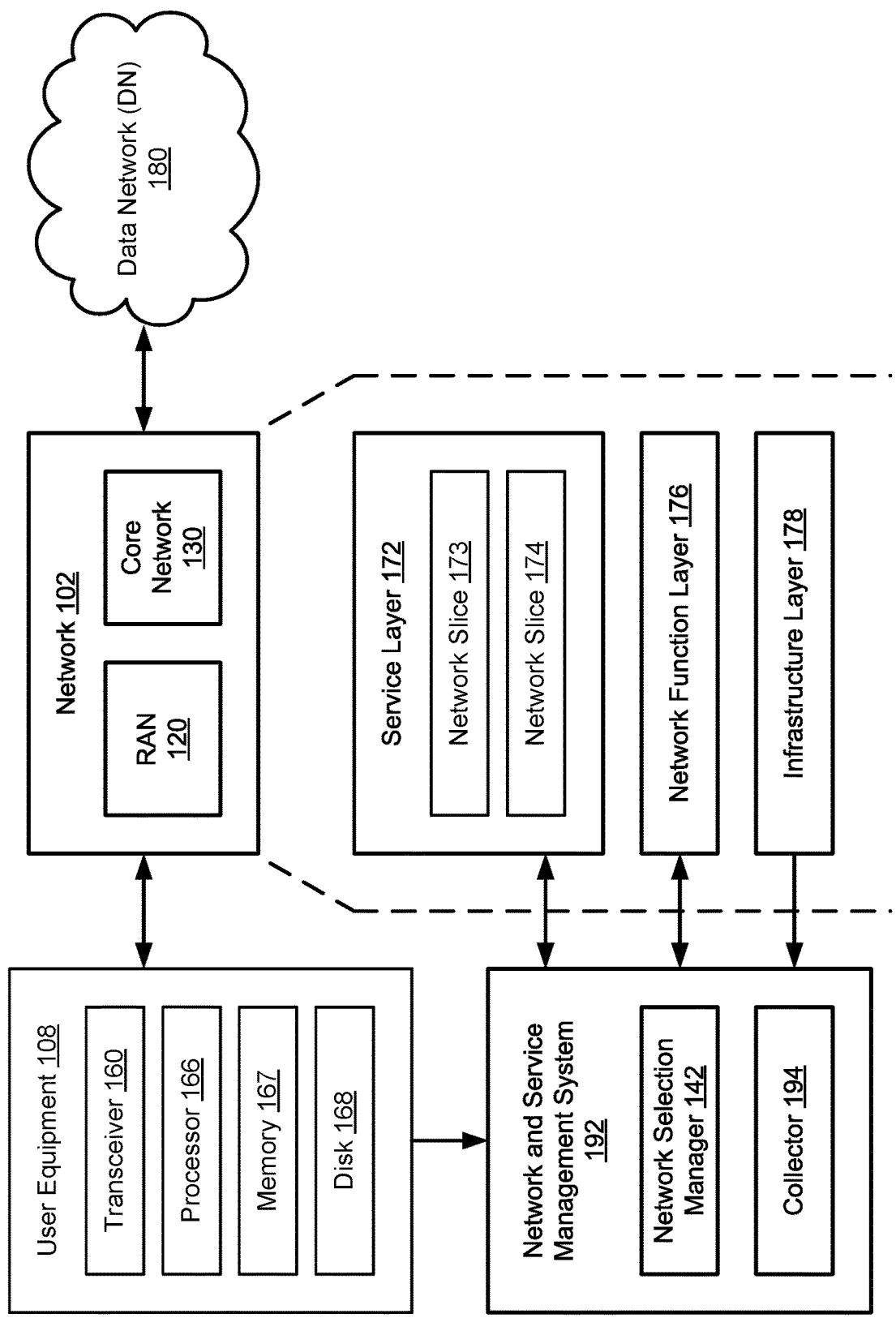
FIG. 1B depicts one embodiment of the wireless networking environment of FIG. 1A in which a network and service management system includes a network selection manager and a data collector.

FIG. 1B depicts one embodiment of the wireless networking environment of FIG. 1A in which the network and service management system 192 includes a network selection manager 142 and a collector 194. The collector 194 may store user device data and network data associated with UE devices utilizing network services within the wireless networking environment. The network selection manager 142 may adjust or update the configuration of network slices and protocol data unit (PDU) sessions associated with UE devices utilizing network services provided by the network 102 based on determinations made using the user device data and the network data stored within the collector 194.

The network 102 may comprise an infrastructure layer 178, a network function layer 176, and a service layer 172 that provides network services. Network slicing may allow for the multiplexing of virtualized and independent logical networks that use the same underlying physical network infrastructure or infrastructure layer 178. The network function layer 176 may run on or utilize the infrastructure layer 178 to implement various network functions corresponding with one or more network slices. For example, core network functions for implementing the core network 130 may be implemented at the network function layer 176. The service layer 172 includes network slices 173 and 174. Each network slice within the service layer 172 may comprise an isolated end-to-end network that is configured to serve one or more SLA requirement.

Figure 1C:
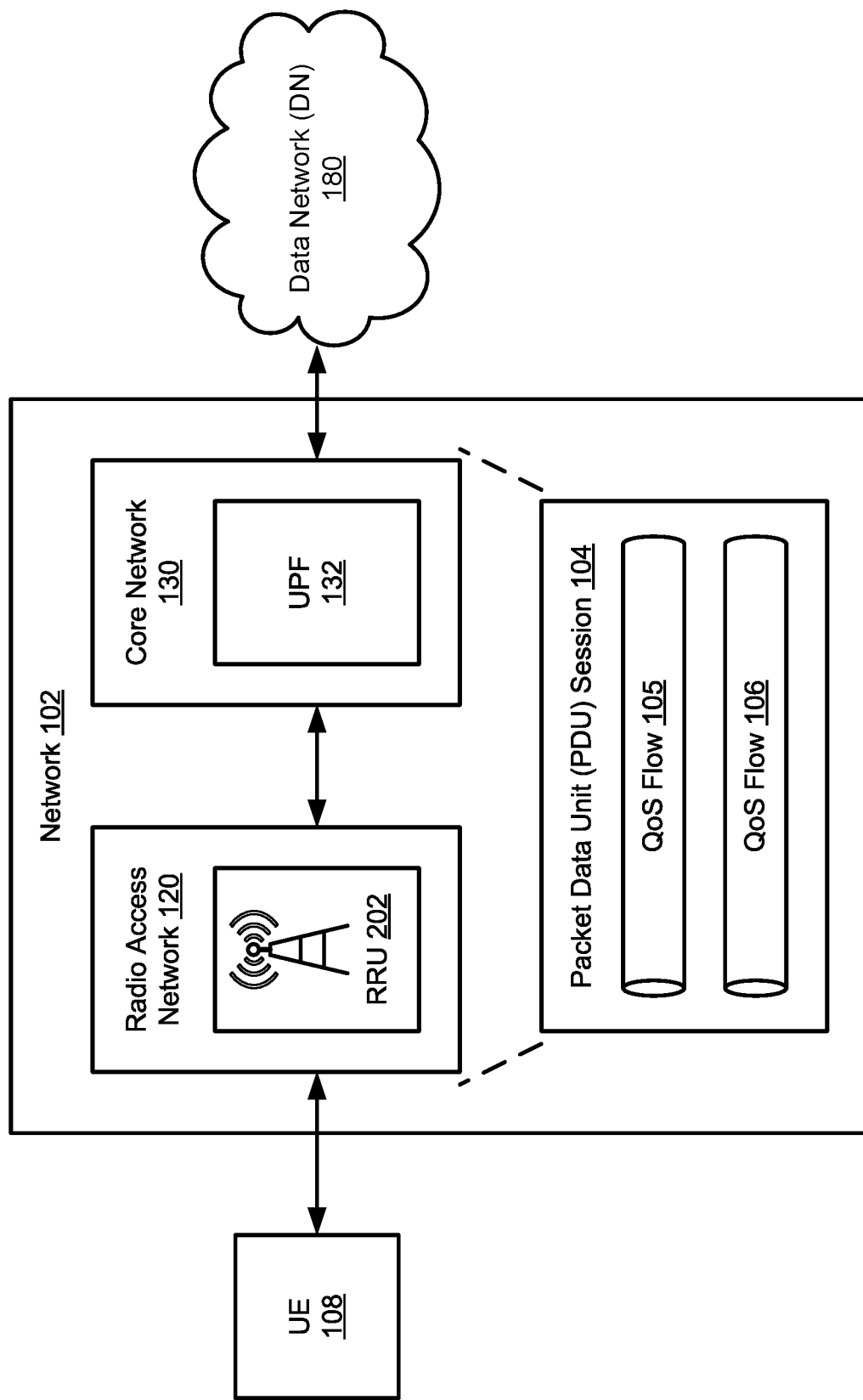
FIG. 1C depicts one embodiment of a network including a radio access network (RAN) and a core network.

FIG. 1C depicts an embodiment of a network 102 including a radio access network (RAN) 120 and a core network 130. The network 102 may comprise a 5G wireless network. The radio access network 120 may comprise a new-generation radio access network (NG-RAN) that uses the 5G new radio interface (NR). The network 102 connects user equipment (UE) 108 to the data network (DN) 180 using the radio access network 120 and the core network 130. The data network 180 may comprise a voice and data network, a local area network (LAN), a wide area network (WAN), a private data network, a wireless network, a wired network, or a combination of networks. The UE 108 may comprise an electronic device with wireless connectivity or cellular communication capability, such as a mobile phone or handheld computing device. In at least one example, the UE 108 may comprise a 5G smartphone or a 5G cellular device that connects to the radio access network 120 via a wireless connection. The UE 108 may comprise one of a number of UEs not depicted that are in communication with the radio access network 120. The UEs may include mobile and non-mobile computing devices. The UEs may include laptop computers, desktop computers, an Internet-of-Things (IoT) devices, and/or any other electronic computing device that includes a wireless communications interface to access the radio access network 120.

The radio access network 120 includes a remote radio unit (RRU) 202 for wirelessly communicating with UE 108. The remote radio unit (RRU) 202 may comprise a radio unit (RU) and may include one or more radio transceivers for wirelessly communicating with UE 108. The remote radio unit (RRU) 202 may include circuitry for converting signals sent to and from an antenna of a base station into digital signals for transmission over packet networks. The radio access network 120 may correspond with a 5G radio base station that connects user equipment to the core network 130. The 5G radio base station may be referred to as a generation Node B, a "gNodeB," or a "gNB." A base station may refer to a network element that is responsible for the transmission and reception of radio signals in one or more cells to or from user equipment, such as UE 108.

The core network 130 may utilize a cloud-native service-based architecture (SBA) in which different core network functions (e.g., authentication, security, session management, and core access and mobility functions) are virtualized and implemented as loosely coupled independent services that communicate with each other, for example, using HTTP protocols and APIs. In some cases, control plane (CP) functions may interact with each other using the service-based architecture. In at least one embodiment, a microservices-based architecture in which software is composed of small independent services that communicate over well-defined APIs may be used for implementing some of the core network functions. For example, control plane (CP) network functions for performing session management may be implemented as containerized applications or microservices. Although a microservice-based architecture does not necessarily require a container-based implementation, a container-based implementation may offer improved scalability and availability over other approaches. Network functions that have been implemented using microservices may store their state information using the unstructured data storage function (UDSF) that supports data storage for stateless network functions across the service-based architecture (SBA).

The primary core network functions may comprise the access and mobility management function (AMF), the session management function (SMF), and the user plane function (UPF). The UPF (e.g., UPF 132) may perform packet processing including routing and forwarding, quality of service (QoS) handling, and packet data unit (PDU) session management. The UPF may serve as an ingress and egress point for user plane traffic and provide anchored mobility support for user equipment. For example, the UPF 132 may provide an anchor point between the UE 108 and the data network 180 as the UE 108 moves between coverage areas. The AMF may act as a single-entry point for a UE connection and perform mobility management, registration management, and connection management between a data network and UE. The SMF may perform session management, user plane selection, and IP address allocation.

Other core network functions may include a network repository function (NRF) for maintaining a list of available network functions and providing network function service registration and discovery, a policy control function (PCF) for enforcing policy rules for control plane functions, an authentication server function (AUSF) for authenticating user equipment and handling authentication related functionality, a network slice selection function (NSSF) for selecting network slice instances, and an application function (AF) for providing application services. Application-level session information may be exchanged between the AF and PCF (e.g., bandwidth requirements for QoS). In some cases, when user equipment requests access to resources, such as establishing a PDU session or a QoS flow, the PCF may dynamically decide if the user equipment should grant the requested access based on a location of the user equipment.

A network slice may comprise an independent end-to-end logical communications network that includes a set of logically separated virtual network functions. Network slicing may allow different logical networks or network slices to be implemented using the same compute and storage infrastructure. Therefore, network slicing may allow heterogeneous services to coexist within the same network architecture via allocation of network computing, storage, and communication resources among active services. In some cases, the network slices may be dynamically created and adjusted over time based on network requirements. For example, some networks may require ultra-low-latency or ultra-reliable services. To meet ultra-low-latency requirements, components of the radio access network 120, such as a distributed unit (DU) and a centralized unit (CU), may need to be deployed at a cell site or in a local data center (LDC) that is in close proximity to a cell site such that the latency requirements are satisfied (e.g., such that the one-way latency from the cell site to the DU component or CU component is less than 1.2 ms).

In some embodiments, the distributed unit (DU) and the centralized unit (CU) of the radio access network 120 may be co-located with the remote radio unit (RRU) 202. In other embodiments, the distributed unit (DU) and the remote radio unit (RRU) 202 may be co-located at a cell site and the centralized unit (CU) may be located within a local data center (LDC).

The network 102 may provide one or more network slices, wherein each network slice may include a set of network functions that are selected to provide specific telecommunications services. For example, each network slice may comprise a configuration of network functions, network applications, and underlying cloud-based compute and storage infrastructure. In some cases, a network slice may correspond with a logical instantiation of a 5G network, such as an instantiation of the network 102. In some cases, the network 102 may support customized policy configuration and enforcement between network slices per service level agreements (SLAs) within the radio access network (RAN) 120. User equipment, such as UE 108, may connect to multiple network slices at the same time (e.g., eight different network slices). In one embodiment, a PDU session, such as PDU session 104, may belong to only one network slice instance.

In some cases, the network 102 may dynamically generate network slices to provide telecommunications services for various use cases, such the enhanced Mobile Broadband (eMBB), Ultra-Reliable and Low-Latency Communication (URLCC), and massive Machine Type Communication (mMTC) use cases.

A cloud-based compute and storage infrastructure may comprise a networked computing environment that provides a cloud computing environment. Cloud computing may refer to Internet-based computing, wherein shared resources, software, and/or information may be provided to one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

The core network 130 may include a plurality of network elements that are configured to offer various data and telecommunications services to subscribers or end users of user equipment, such as UE 108. Examples of network elements include network computers, network processors, networking hardware, networking equipment, routers, switches, hubs, bridges, radio network controllers, gateways, servers, virtualized network functions, and network functions virtualization infrastructure. A network element may comprise a real or virtualized component that provides wired or wireless communication network services.

Virtualization allows virtual hardware to be created and decoupled from the underlying physical hardware. One example of a virtualized component is a virtual router (or a vRouter). Another example of a virtualized component is a virtual machine. A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored as a set of files including a virtual disk file for storing the contents of a virtual disk and a virtual machine configuration file for storing configuration settings for the virtual machine. The configuration settings may include the number of virtual processors (e.g., four virtual CPUs), the size of a virtual memory, and the size of a virtual disk (e.g., a 64 GB virtual disk) for the virtual machine. Another example of a virtualized component is a software container or an application container that encapsulates an application's environment.

In some embodiments, applications and services may be run using virtual machines instead of containers in order to improve security. A common virtual machine may also be used to run applications and/or containers for a number of closely related network services.

The network 102 may implement various network functions, such as the core network functions and radio access network functions, using a cloud-based compute and storage infrastructure. A network function may be implemented as a software instance running on hardware or as a virtualized network function. Virtual network functions (VNFs) may comprise implementations of network functions as software processes or applications. In at least one example, a virtual network function (VNF) may be implemented as a software process or application that is run using virtual machines (VMs) or application containers within the cloud-based compute and storage infrastructure. Application containers (or containers) allow applications to be bundled with their own libraries and configuration files, and then executed in isolation on a single operating system (OS) kernel. Application containerization may refer to an OS-level virtualization method that allows isolated applications to be run on a single host and access the same OS kernel. Containers may run on bare-metal systems, cloud instances, and virtual machines. Network functions virtualization may be used to virtualize network functions, for example, via virtual machines, containers, and/or virtual hardware that runs processor readable code or executable instructions stored in one or more computer-readable storage mediums (e.g., one or more data storage devices).

As depicted in FIG. 1C, the core network 130 includes a user plane function (UPF) 132 for transporting IP data traffic (e.g., user plane traffic) between the UE 108 and the data network 180 and for handling packet data unit (PDU) sessions with the data network 180. The UPF 132 may comprise an anchor point between the UE 108 and the data network 180. The UPF 132 may be implemented as a software process or application running within a virtualized infrastructure or a cloud-based compute and storage infrastructure. The network 102 may connect the UE 108 to the data network 180 using a packet data unit (PDU) session 104, which may comprise part of an overlay network.

The PDU session 104 may utilize one or more quality of service (QoS) flows, such as QoS flows 105 and 106, to exchange traffic (e.g., data and voice traffic) between the UE 108 and the data network 180. The one or more QoS flows may comprise the finest granularity of QoS differentiation within the PDU session 104. The PDU session 104 may belong to a network slice instance through the network 102. To establish user plane connectivity from the UE 108 to the data network 180, an AMF that supports the network slice instance may be selected and a PDU session via the network slice instance may be established. In some cases, the PDU session 104 may be of type IPv4 or IPv6 for transporting IP packets. The radio access network 120 may be configured to establish and release parts of the PDU session 104 that cross the radio interface.

The radio access network 120 may include a set of one or more remote radio units (RRUs) that includes radio transceivers (or combinations of radio transmitters and receivers) for wirelessly communicating with UEs. The set of RRUs may correspond with a network of cells (or coverage areas) that provide continuous or nearly continuous overlapping service to UEs, such as UE 108, over a geographic area. Some cells may correspond with stationary coverage areas and other cells may correspond with coverage areas that change over time (e.g., due to movement of a mobile RRU).

In some cases, the UE 108 may be capable of transmitting signals to and receiving signals from one or more RRUs within the network of cells over time. One or more cells may correspond with a cell site. The cells within the network of cells may be configured to facilitate communication between UE 108 and other UEs and/or between UE 108 and a data network, such as data network 180. The cells may include macrocells (e.g., capable of reaching 18 miles) and small cells, such as microcells (e.g., capable of reaching 1.2 miles), picocells (e.g., capable of reaching 0.12 miles), and femtocells (e.g., capable of reaching 32 feet). Small cells may communicate through macrocells. Although the range of small cells may be limited, small cells may enable mmWave frequencies with high-speed connectivity to UEs within a short distance of the small cells. Macrocells may transit and receive radio signals using multiple-input multiple-output (MIMO) antennas that may be connected to a cell tower, an antenna mast, or a raised structure.

Referring to FIG. 1C, the UPF 132 may be responsible for routing and forwarding user plane packets between the radio access network 120 and the data network 180. Uplink packets arriving from the radio access network 120 may use a general packet radio service (GPRS) tunneling protocol (or GTP tunnel) to reach the UPF 132. The GPRS tunneling protocol for the user plane may support multiplexing of traffic from different PDU sessions by tunneling user data over the interface between the radio access network 120 and the UPF 132.

The UPF 132 may remove the packet headers belonging to the GTP tunnel before forwarding the user plane packets towards the data network 180. As the UPF 132 may provide connectivity towards other data networks in addition to the data network 180, the UPF 132 must ensure that the user plane packets are forwarded towards the correct data network. Each GTP tunnel may belong to a specific PDU session, such as PDU session 104. Each PDU session may be set up towards a specific data network name (DNN) that uniquely identifies the data network to which the user plane packets should be forwarded. The UPF 132 may keep a record of the mapping between the GTP tunnel, the PDU session, and the DNN for the data network to which the user plane packets are directed.

Downlink packets arriving from the data network 180 are mapped onto a specific QoS flow belonging to a specific PDU session before forwarded towards the appropriate radio access network 120. A QoS flow may correspond with a stream of data packets that have equal quality of service (QoS). A PDU session may have multiple QoS flows, such as the QoS flows 105 and 106 that belong to PDU session 104. The UPF 132 may use a set of service data flow (SDF) templates to map each downlink packet onto a specific QoS flow. The UPF 132 may receive the set of SDF templates from a session management function (SMF), such as the SMF 133 depicted in FIG. 1D, during setup of the PDU session 104. The SMF may generate the set of SDF templates using information provided from a policy control function (PCF). The UPF 132 may track various statistics regarding the volume of data transferred by each PDU session, such as PDU session 104, and provide the information to an SMF.

Figure 1D:
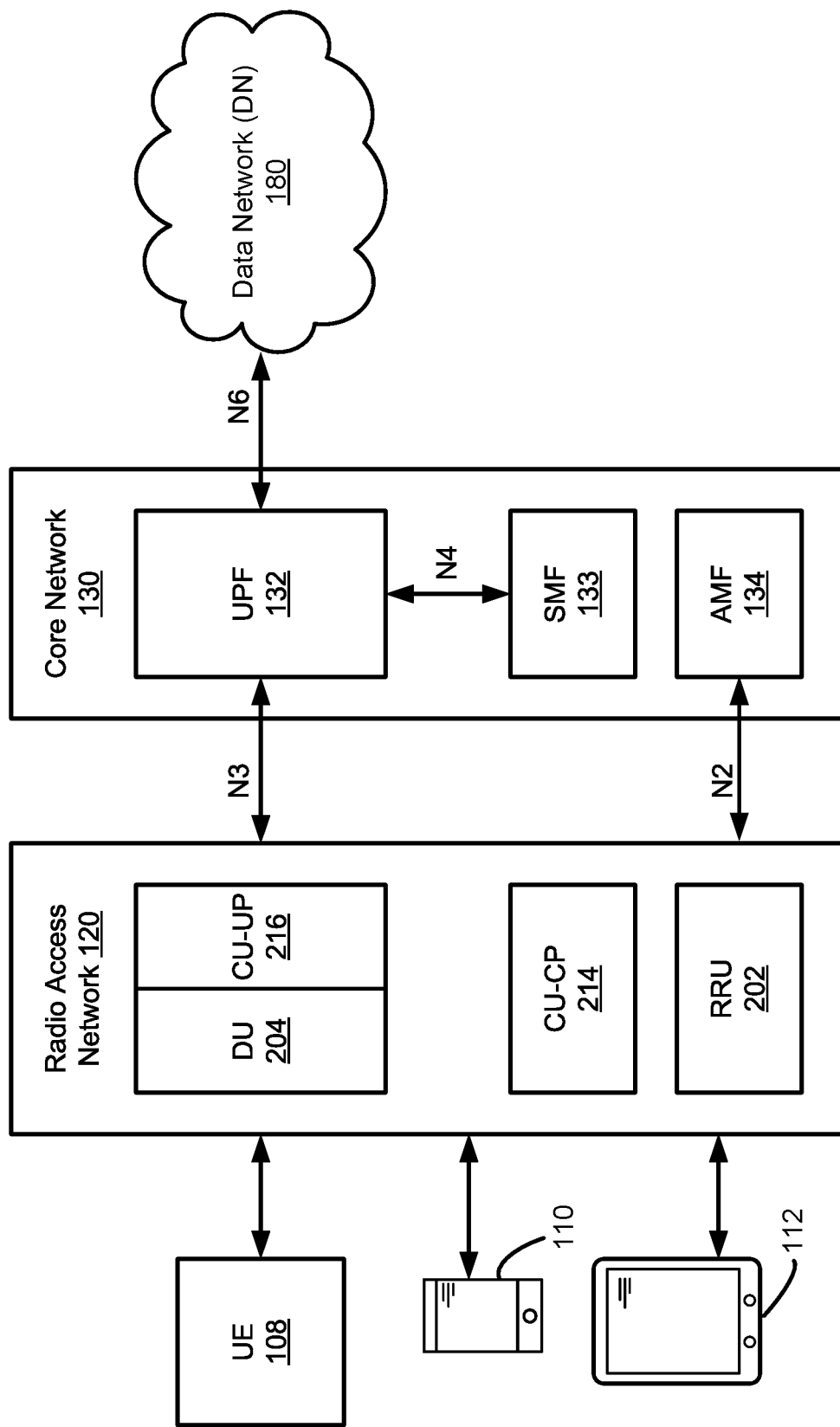
FIGS. 1D-1E depict embodiments of a radio access network and a core network for providing a communications channel between user equipment and a data network.

FIG. 1D depicts an embodiment of a radio access network 120 and a core network 130 for providing a communications channel (or channel) between user equipment and data network 180. The communications channel may comprise a pathway through which data is communicated between the UE 108 and the data network 180. The user equipment in communication with the radio access network 120 includes UE 108, mobile phone 110, and mobile computing device 112. The user equipment may include a plurality of electronic devices, including mobile computing device and non-mobile computing device.

The core network 130 includes network functions such as an access and mobility management function (AMF) 134, a session management function (SMF) 133, and a user plane function (UPF) 132. The AMF may interface with user equipment and act as a single-entry point for a UE connection. The AMF may interface with the SMF to track user sessions. The AMF may interface with a network slice selection function (NSSF) not depicted to select network slice instances for user equipment, such as UE 108. When user equipment is leaving a first coverage area and entering a second coverage area, the AMF may be responsible for coordinating the handoff between the coverage areas whether the coverage areas are associated with the same radio access network or different radio access networks.

The UPF 132 may transfer downlink data received from the data network 180 to user equipment, such as UE 108, via the radio access network 120 and/or transfer uplink data received from user equipment to the data network 180 via the radio access network 180. An uplink may comprise a radio link though which user equipment transmits data and/or control signals to the radio access network 120. A downlink may comprise a radio link through which the radio access network 120 transmits data and/or control signals to the user equipment.

The radio access network 120 may be logically divided into a remote radio unit (RRU) 202, a distributed unit (DU) 204, and a centralized unit (CU) that is partitioned into a CU user plane portion CU-UP 216 and a CU control plane portion CU-CP 214. The CU-UP 216 may correspond with the centralized unit for the user plane and the CU-CP 214 may correspond with the centralized unit for the control plane. The CU-CP 214 may perform functions related to a control plane, such as connection setup, mobility, and security. The CU-UP 216 may perform functions related to a user plane, such as user data transmission and reception functions.

Decoupling control signaling in the control plane from user plane traffic in the user plane may allow the UPF 132 to be positioned in close proximity to the edge of a network compared with the AMF 134. As a closer geographic or topographic proximity may reduce the electrical distance, this means that the electrical distance from the UPF 132 to the UE 108 may be less than the electrical distance of the AMF 134 to the UE 108. The radio access network 120 may be connected to the AMF 134, which may allocate temporary unique identifiers, determine tracking areas, and select appropriate policy control functions (PCFs) for user equipment, via an N2 interface. The N3 interface may be used for transferring user data (e.g., user plane traffic) from the radio access network 120 to the user plane function UPF 132 and may be used for providing low-latency services using edge computing resources. The electrical distance from the UPF 132 (e.g., located at the edge of a network) to user equipment, such as UE 108, may impact the latency and performance services provided to the user equipment. The UE 108 may be connected to the SMF 133 via an N1 interface not depicted, which may transfer UE information directly to the AMF 134. The UPF 132 may be connected to the data network 180 via an N6 interface. The N6 interface may be used for providing connectivity between the UPF 132 and other external or internal data networks (e.g., to the Internet). The radio access network 120 may be connected to the SMF 133, which may manage UE context and network handovers between base stations, via the N2 interface. The N2 interface may be used for transferring control plane signaling between the radio access network 120 and the AMF 134.

The RRU 202 may perform physical layer functions, such as employing orthogonal frequency-division multiplexing (OFDM) for downlink data transmission. In some cases, the DU 204 may be located at a cell site (or a cellular base station) and may provide real-time support for lower layers of the protocol stack, such as the radio link control (RLC) layer and the medium access control (MAC) layer. The CU may provide support for higher layers of the protocol stack, such as the service data adaptation protocol (SDAP) layer, the packet data convergence control (PDCP) layer, and the radio resource control (RRC) layer. The SDAP layer may comprise the highest L2 sublayer in the 5G NR protocol stack. In some embodiments, a radio access network may correspond with a single CU that connects to multiple DUs (e.g., 10 DUs), and each DU may connect to multiple RRUs (e.g., 18 RRUs). In this case, a single CU may manage 10 different cell sites (or cellular base stations) and 180 different RRUs.

In some embodiments, the radio access network 120 or portions of the radio access network 120 may be implemented using multi-access edge computing (MEC) that allows computing and storage resources to be moved closer to user equipment. Allowing data to be processed and stored at the edge of a network that is located close to the user equipment may be necessary to satisfy low-latency application requirements. In at least one example, the DU 204 and CU-UP 216 may be executed as virtual instances within a data center environment that provides single-digit millisecond latencies (e.g., less than 2 ms) from the virtual instances to the UE 108.

Figure 1E:
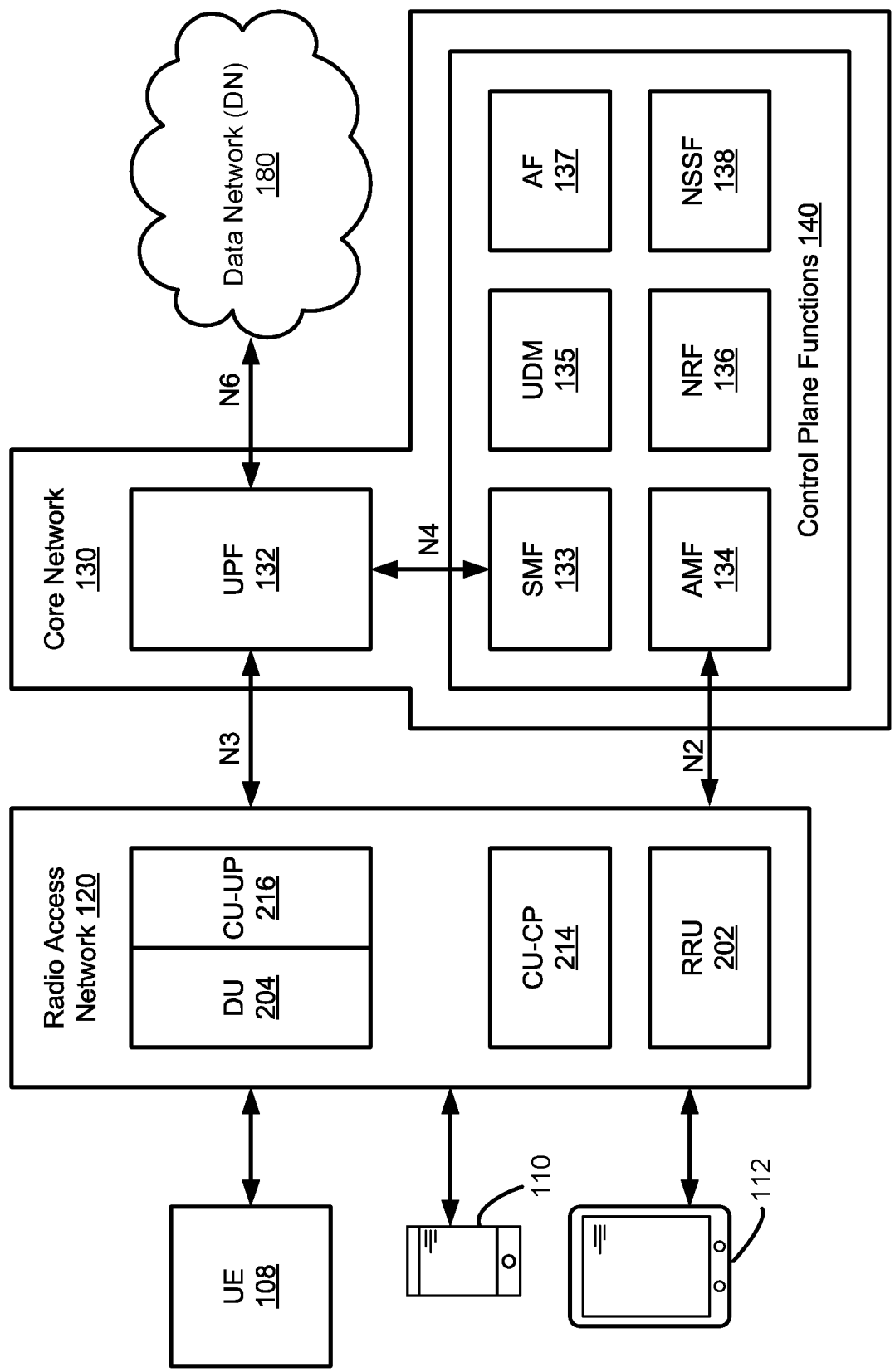

FIG. 1E depicts an embodiment of a radio access network 120 and a core network 130 for providing a communications channel (or channel) between user equipment and data network 180. The core network 130 includes UPF 132 for handling user data in the core network 130. Data is transported between the radio access network 120 and the core network 130 via the N3 interface. The data may be tunneled across the N3 interface (e.g., IP routing may be done on the tunnel header IP address instead of using end user IP addresses). This may allow for maintaining a stable IP anchor point even though UE 108 may be moving around a network of cells or moving from one coverage area into another coverage area. The UPF 132 may connect to external data networks, such as the data network 180 via the N6 interface. The data may not be tunneled across the N6 interface as IP packets may be routed based on end user IP addresses. The UPF 132 may connect to the SMF 133 via the N4 interface.

As depicted, the core network 130 includes a group of control plane functions 140 comprising SMF 133, AMF 134, UDM 135, NRF 136, AF 137, and NSSF 138. The SMF 133 may configure or control the UPF 132 via the N4 interface. For example, the SMF 133 may control packet forwarding rules used by the UPF 132 and adjust QoS parameters for QoS enforcement of data flows (e.g., limiting available data rates). In some cases, multiple SMF/UPF pairs may be used to simultaneously manage user plane traffic for a particular user device, such as UE 108. For example, a set of SMFs may be associated with UE 108, wherein each SMF of the set of SMFs corresponds with a network slice. The SMF 133 may control the UPF 132 on a per end user data session basis, in which the SMF 133 may create, update, and remove session information in the UPF 132.

In some cases, the SMF 133 may select an appropriate UPF for a user plane path by querying the NRF 136 to identify a list of available UPFs and their corresponding capabilities and locations. The SMF 133 may select the UPF 132 based on a physical location of the UE 108 and a physical location of the UPF 132 (e.g., corresponding with a physical location of a data center in which the UPF 132 is running). The SMF 133 may also select the UPF 132 based on a particular network slice supported by the UPF 132 or based on a particular data network that is connected to the UPF 132. The ability to query the NRF 136 for UPF information eliminates the need for the SMF 133 to store and update the UPF information for every available UPF within the core network 130.

In some embodiments, the SMF 133 may query the NRF 136 to identify a set of available UPFs for a packet data unit (PDU) session and acquire UPF information from a variety of sources, such as the AMF 134 or the UE 108. The UPF information may include a location of the UPF 132, a location of the UE 108, the UPF's dynamic load, the UPF's static capacity among UPFs supporting the same data network, and the capability of the UPF 132.

The unified data management function (UDM) 135 may manage user registrations and network profiles. The UDM 135 may provide access and mobility subscription data to the AMF 134 during registration and provide subscriber information to the SMF 133 during the establishment of a PDU session. The UDM 135 may be paired with a user data repository (UDR) not depicted to store user data such as subscriber information, authentication information, and encryption keys.

The radio access network 120 may provide separation of the centralized unit for the control plane (CU-CP) 216 and the centralized unit for the user plane (CU-UP) 214 functionalities while supporting network slicing. The CU-CP 216 may obtain resource utilization and latency information from the DU 204 and/or the CU-UP 216, and select a CU-UP to pair with the DU 204 based on the resource utilization and latency information in order to configure a network slice. Network slice configuration information associated with the network slice may be provided to the UE 108 for purposes of initiating communication with the UPF 132 using the network slice.

FIG. 2A depicts one embodiment of a network and service management system 192. The network and service management system 192 may utilize one or more machine learning models to identify an updated set of network slices for providing a network service, to detect anomalies in expected UE device behavior, and/or for detecting anomalies in network conditions.

As depicted, the network and service management system 192 includes hardware-level components and software-level components. The hardware-level components include one or more processors 270, one or more memory 271, and one or more disks 272. The software-level components include software applications, such as the network selection manager 142 and the artificial intelligence (AI) driven system 252. The AI driven system 252 includes a machine learning model trainer 256, machine learning models 258, and training data 254. The machine learning models 258 may comprise one or more machine learning models that are stored in a memory, such as memory 271. The one or more machine learning models may be trained, executed, and/or deployed using one or more processors, such as processor 270. The one or more machine learning models may include neural networks (e.g., deep neural networks), support vector machine models, decision tree-based models, k-nearest neighbor models, Bayesian networks, or other types of models such as linear models and/or non-linear models. A linear model may be specified as a linear combination of input features. A neural network may comprise a feed-forward neural network, recurrent neural network, or a convolutional neural network.

The software-level components may be run using the hardware-level components or executed using processor and storage components of the hardware-level components. For example, one or more of the software-level components may be executed or run using the processor 270, memory 271, and disk 272. In another example, one or more of the software-level components may be executed or run using a virtual processor and a virtual memory that are themselves executed or generated using the processor 270, memory 271, and disk 272.

The software-level components also include virtualization layer processes, such as virtual machine 273, hypervisor 274, container engine 275, and host operating system 276. The hypervisor 274 may comprise a native hypervisor (or bare-metal hypervisor) or a hosted hypervisor (or type 2 hypervisor). The hypervisor 274 may provide a virtual operating platform for running one or more virtual machines, such as virtual machine 273. A hypervisor may comprise software that creates and runs virtual machine instances. Virtual machine 273 may include a plurality of virtual hardware devices, such as a virtual processor, a virtual memory, and a virtual disk. The virtual machine 273 may include a guest operating system that has the capability to run one or more software applications, such as the network selection manager 142. The virtual machine 273 may run the host operation system 276 upon which the container engine 275 may run. A virtual machine, such as virtual machine 273, may include one or more virtual processors.

A container engine 275 may run on top of the host operating system 276 in order to run multiple isolated instances (or containers) on the same operating system kernel of the host operating system 276. Containers may perform virtualization at the operating system level and may provide a virtualized environment for running applications and their dependencies. The container engine 275 may acquire a container image and convert the container image into running processes. In some cases, the container engine 275 may group containers that make up an application into logical units (or pods). A pod may contain one or more containers and all containers in a pod may run on the same node in a cluster. Each pod may serve as a deployment unit for the cluster. Each pod may run a single instance of an application.

In order to scale an application horizontally, multiple instances of a pod may be run in parallel. A "replica" may refer to a unit of replication employed by a computing platform to provision or deprovision resources. Some computing platforms may run containers directly and therefore a container may comprise the unit of replication. Other computing platforms may wrap one or more containers into a pod and therefore a pod may comprise the unit of replication.

In some embodiments, a virtualized infrastructure manager not depicted may be used to provide a centralized platform for managing a virtualized infrastructure for deploying various components of the network and service management system 192. The virtualized infrastructure manager may manage the provisioning of virtual machines, containers, and pods. The virtualized infrastructure manager may also manage a replication controller responsible for managing a number of pods. In some cases, the virtualized infrastructure manager may perform various virtualized infrastructure related tasks, such as cloning virtual machines, creating new virtual machines, monitoring the state of virtual machines, and facilitating backups of virtual machines.

In some embodiments, the network and service management system 192 may utilize the machine learning model trainer 256, machine learning models 258, and training data 254 to implement supervised machine learning algorithms. Supervised machine learning may refer to machine learning methods where labeled training data is used to train or generate a machine learning model or set of mapping functions that maps input feature vectors to output predicted answers. The trained machine learning model may then be deployed to map new input feature vectors to predicted answers. Supervised machine learning may be used to solve regression and classification problems. A regression problem is where the output predicted answer comprises a numerical value. Regression algorithms may include linear regression, polynomial regression, and logistic regression algorithms. A classification problem is where the output predicted answer comprises a label (or an identification of a particular class). Classification algorithms may include support vector machine, decision tree, k-nearest neighbor, and random forest algorithms. In some cases, a support vector machine algorithm may determine a hyperplane (or decision boundary) that maximizes the distance between data points for two different classes. The hyperplane may separate the data points for the two different classes and a margin between the hyperplane and a set of nearest data points (or support vectors) may be determined to maximize the distance between the data points for the two different classes.

During a training phase, a machine learning model, such as one of the machine learning models 258, may be trained using the machine learning model trainer 256 to generate predicted answers using a set of labeled training data, such as training data 254. The training data 254 may be stored in a memory, such as memory 271. In some cases, labeled data may be split into a training data set and an evaluation data set prior to or during the training phase.

The machine learning model trainer 256 may implement a machine learning algorithm that uses a training data set from the training data 254 to train the machine learning model and uses the evaluation data set to evaluate the predictive ability of the trained machine learning model. The predictive performance of the trained machine learning model may be determined by comparing predicted answers generated by the trained machine learning model with the target answers in the evaluation data set (or ground truth values). For a linear model, the machine learning algorithm may determine a weight for each input feature to generate a trained machine learning model that can output a predicted answer. In some cases, the machine learning algorithm may include a loss function and an optimization technique. The loss function may quantify the penalty that is incurred when a predicted answer generated by the machine learning model does not equal the appropriate target answer. The optimization technique may seek to minimize the quantified loss. One example of an appropriate optimization technique is online stochastic gradient descent.

The network and service management system 192 may configure one or more machine learning models to implement a machine learning classifier that categorizes input features into one or more classes. The one or more machine learning models may be utilized to perform binary classification (assigning an input feature vector to one of two classes) or multi-class classification (assigning an input feature vector to one of three or more classes). The output of the binary classification may comprise a prediction score that indicates the probability that an input feature vector belongs to a particular class. In some cases, a binary classifier may correspond with a function that may be used to decide whether or not an input feature vector (e.g., a vector of numbers representing the input features) should be assigned to either a first class or a second class. The binary classifier may use a classification algorithm that outputs predictions based on a linear predictor function combining a set of weights with the input feature vector. For example, the classification algorithm may compute the scalar product between the input feature vector and a vector of weights and then assign the input feature vector to the first class if the scalar product exceeds a threshold value.

The number of input features (or input variables) of a labeled data set may be referred to as its dimensionality. In some cases, dimensionality reduction may be used to reduce the number of input features that are used for training a machine learning model. The dimensionality reduction may be performed via feature selection (e.g., reducing the dimensional feature space by selecting a subset of the most relevant features from an original set of input features) and feature extraction (e.g., reducing the dimensional feature space by deriving a new feature subspace from the original set of input features). With feature extraction, new features may be different from the input features of the original set of input features and may retain most of the relevant information from a combination of the original set of input features. In one example, feature selection may be performed using sequential backward selection and unsupervised feature extraction may be performed using principal component analysis.

The machine learning model trainer 256 may train the first machine learning model using one or more training or learning algorithms. For example, the machine learning model trainer 256 may utilize backwards propagation of errors (or backpropagation) to train a multi-layer neural network. In some cases, the machine learning model trainer 256 may perform supervised training techniques using a set of labeled training data. In other cases, the machine learning model trainer 256 may perform unsupervised training techniques using a set of unlabeled training data. The machine learning model trainer 256 may perform a number of generalization techniques to improve the generalization capability of the machine learning models being trained, such as weight-decay and dropout regularization.

In some embodiments, the training data 254 may include a set of training examples. In one example, each training example of the set of training examples may include an input-output pair, such as a pair comprising an input vector and a target answer (or supervisory signal). In another example, each training example of the set of training examples may include an input vector and a pair of outcomes corresponding with a first decision to perform a first action (e.g., to transmit a bid response) and a second decision to not perform the first action (e.g., to not transmit a bid response). In this case, each outcome of the pair of outcomes may be scored and a positive label may be applied to the higher scoring outcome while a negative label is applied to the lower scoring outcome.

Figure 2B:
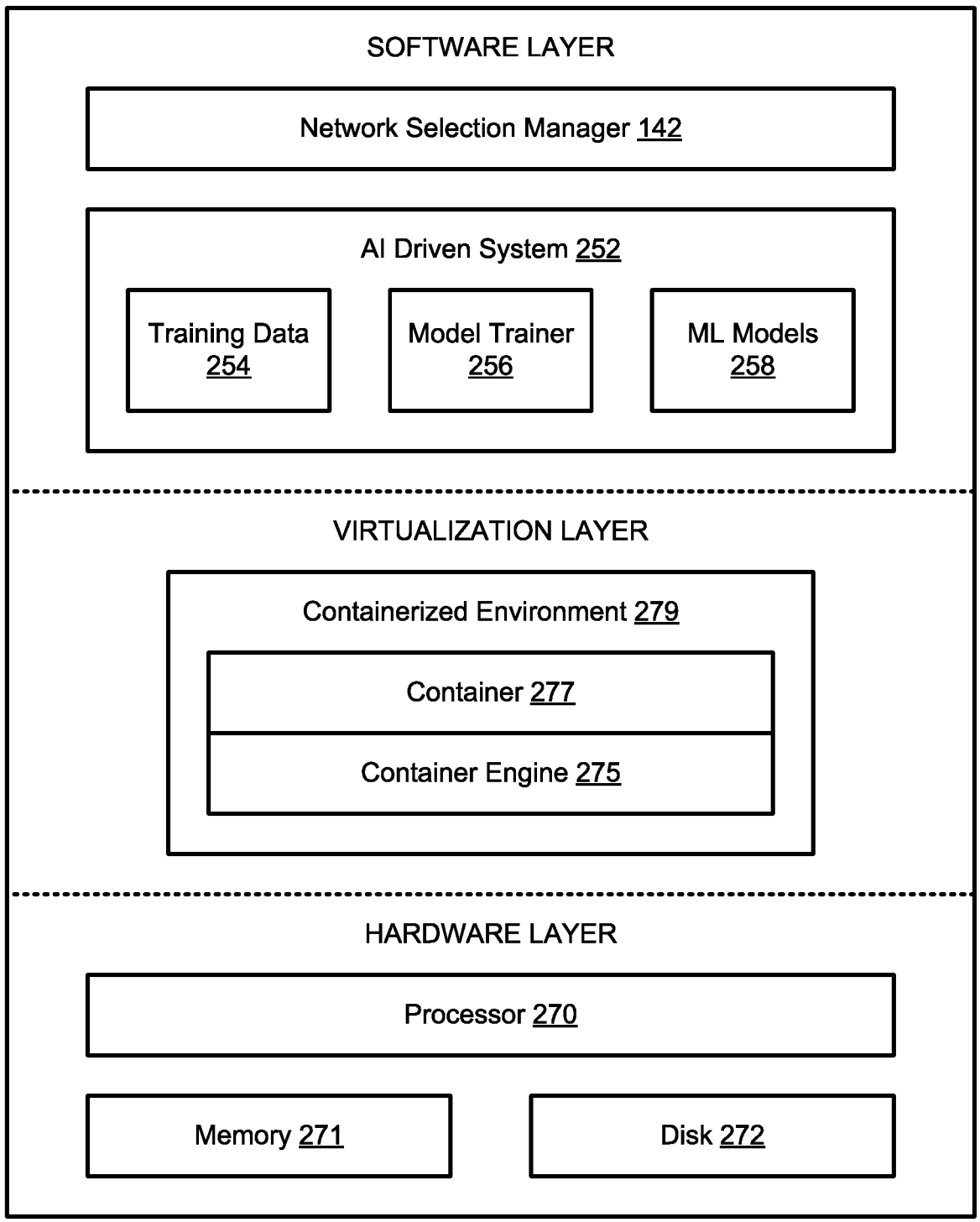
FIG. 2B depicts an embodiment of the network and service management system of FIG. 2A in which the virtualization layer includes a containerized environment.

FIG. 2B depicts an embodiment of the network and service management system 192 of FIG. 2A in which the virtualization layer includes a containerized environment 279. The containerized environment 279 includes a container engine 275 for instantiating and managing application containers, such as container 277. Containerized applications may comprise applications that run in isolated runtime environments (or containers). The containerized environment 279 may include a container orchestration service for automating the deployments of containerized applications. The container 277 may be used to deploy various microservices corresponding with processes executed by the network and service management system 192. The containerized environment 279 may be executed using hardware-level components or executed using processor and storage components of the hardware-level components. In one example, the containerized environment 279 may be run using the processor 270, memory 271, and disk 272. In another example, the containerized environment 279 may be run using a virtual processor and a virtual memory that are themselves executed or generated using the processor 270, memory 271, and disk 272.

Figure 2C:
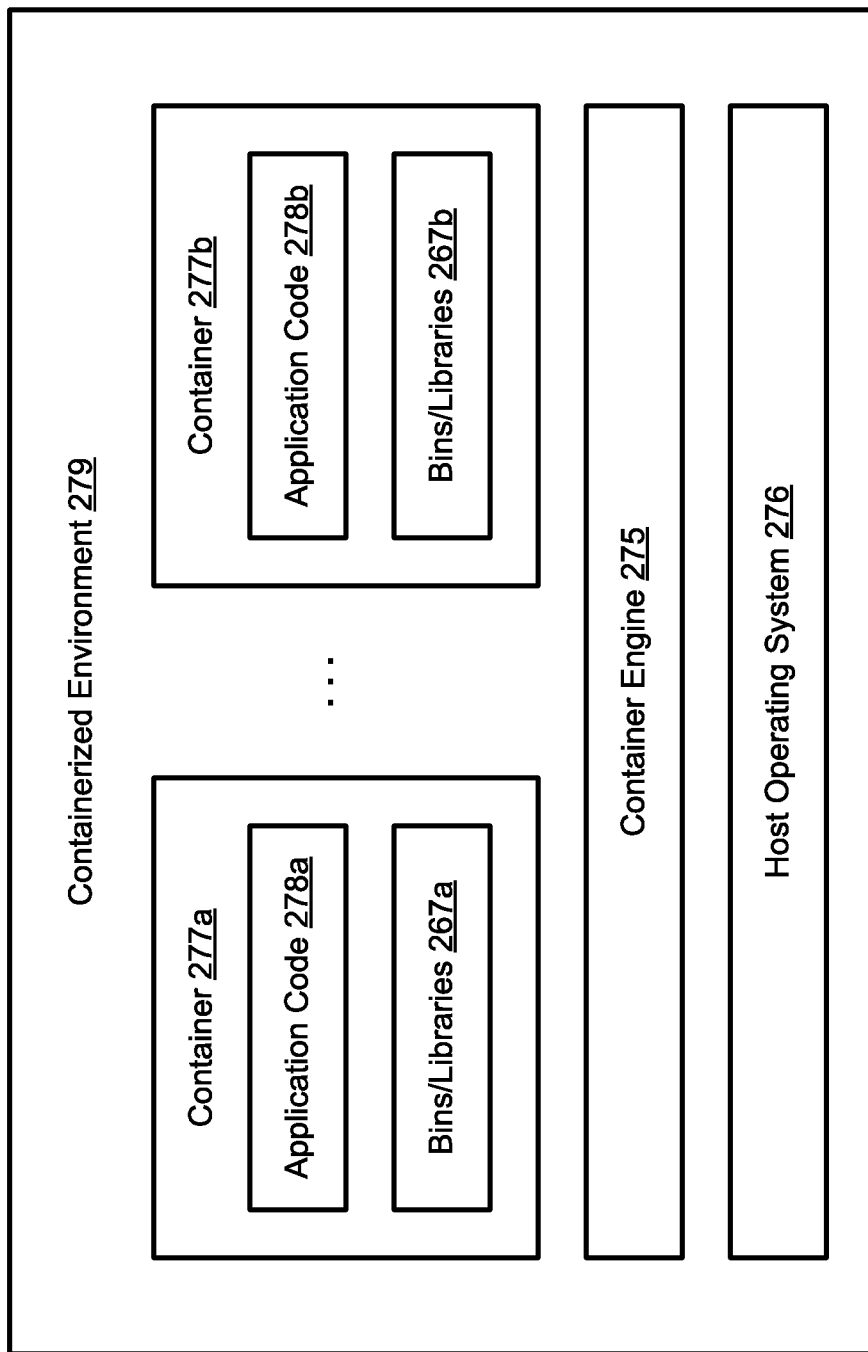
FIG. 2C depicts an embodiment of a containerized environment 279 that includes a container engine 275 running on top of a host operating system 276.

FIG. 2C depicts an embodiment of a containerized environment 279 that includes a container engine 275 running on top of a host operating system 276. The container engine 275 may manage or run containers 277a and 277b on the same operating system kernel of the host operating system 276. The container engine 275 may acquire a container image and convert the container image into one or more running processes. In some cases, the container engine 275 may group containers that make up an application into logical units (or pods). A pod may contain one or more containers and all containers in a pod may run on the same node in a cluster. Each container 277 may include application code 278 and application dependencies 267, such as operating system libraries, required to run the application code 278. As depicted, container 277a includes application code 278a and application dependencies 267a and container 277b includes application code 278b and application dependencies 267b. Containers allow portability by encapsulating an application within a single executable package of software that bundles application code 278 together with the related configuration files, binaries, libraries, and dependencies required to run the application code 278. In one embodiment, applications of the network and service management system 192 may be executed using the containerized environment 279. Containerized applications may be used to isolate the containerized applications from other applications installed on the same computing device.

Figure 3A:
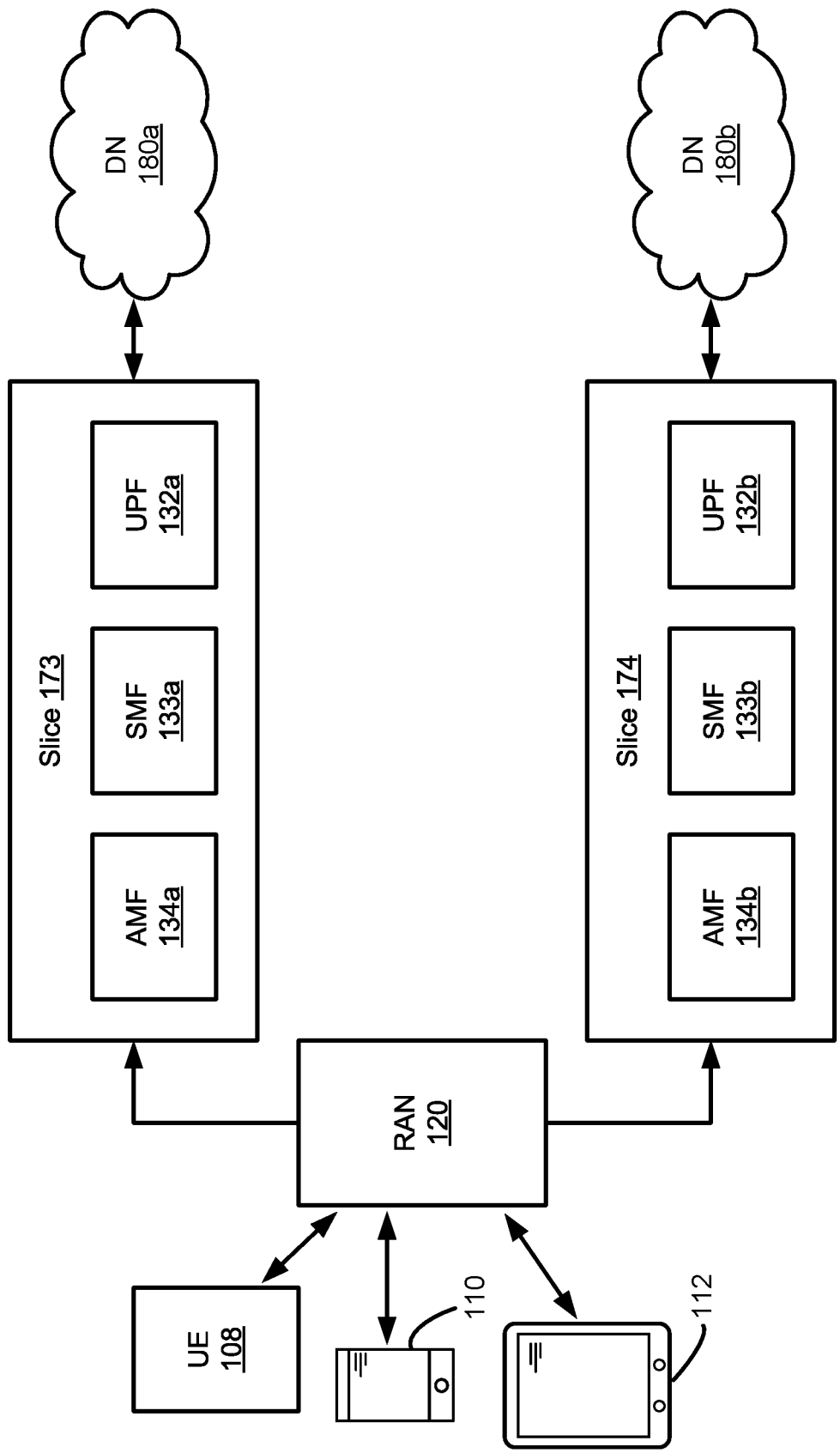
FIG. 3A depicts one embodiment of a wireless networking environment in which multiple UE devices are in communication with data networks via network slices.

FIG. 3A depicts one embodiment of a wireless networking environment in which multiple UE devices including UE 108, mobile phone 110, and mobile computing device 112 are in communication with data networks (DN) 180a and 180b via network slices 173 and 174. The network slices 173 and 174 may correspond with two of the network slices within the service layer 172 of FIG. 1B. As depicted in FIG. 3A, the network slices 173 and 174 do not share any core network functions. For example, network slice 173 utilizes AMF 134a, SMF 133a, and UPF 132a, whereas network slice 174 utilizes AMF 134, SMF 133b, and UPF 132b.

Figure 3B:
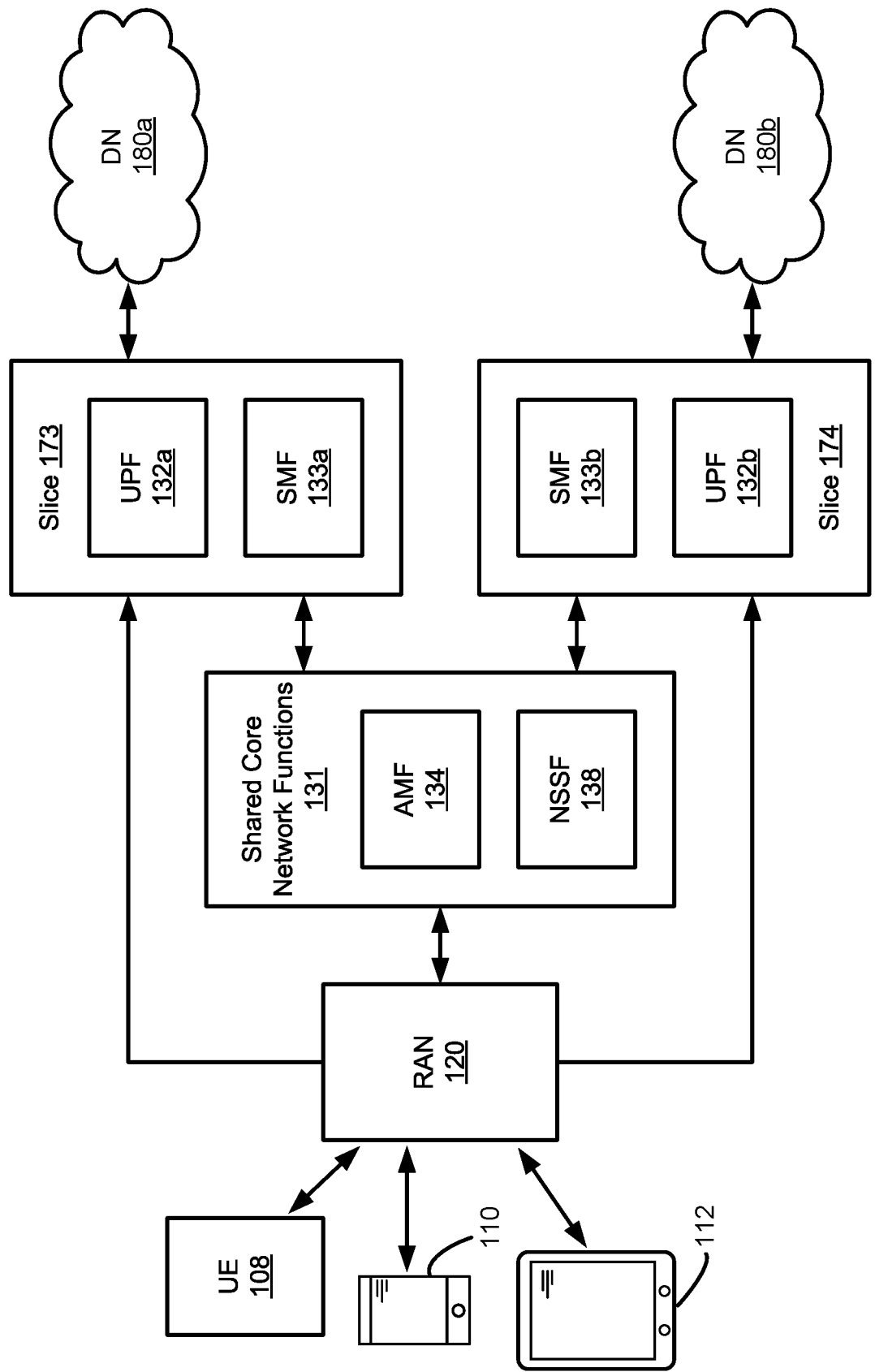
FIG. 3B depicts an embodiment of network slices sharing a set of shared core network functions.

FIG. 3B depicts an embodiment of network slices 173 and 174 sharing a set of shared core network functions 131. The set of shared core network functions 131 includes AMF 134 and NSSF 138. The radio access network (RAN) 120 may support differentiated handling of traffic between isolated network slices 173 and 174 for the UE 108. The network slice selection function (NSSF) 138 within the shared core network functions 131 may support the selection of network slice instances to serve the UE 108. In some cases, network slice selection may be determined by the network (e.g., using either NSSF 138 or AMF 134) based on network slice policy. In some cases, the UE 108 may simultaneously connect to data networks 180a and 180b via the network slices 173 and 174 to support different SLA requirements (e.g., end-to-end latency requirements).

Figure 3C:
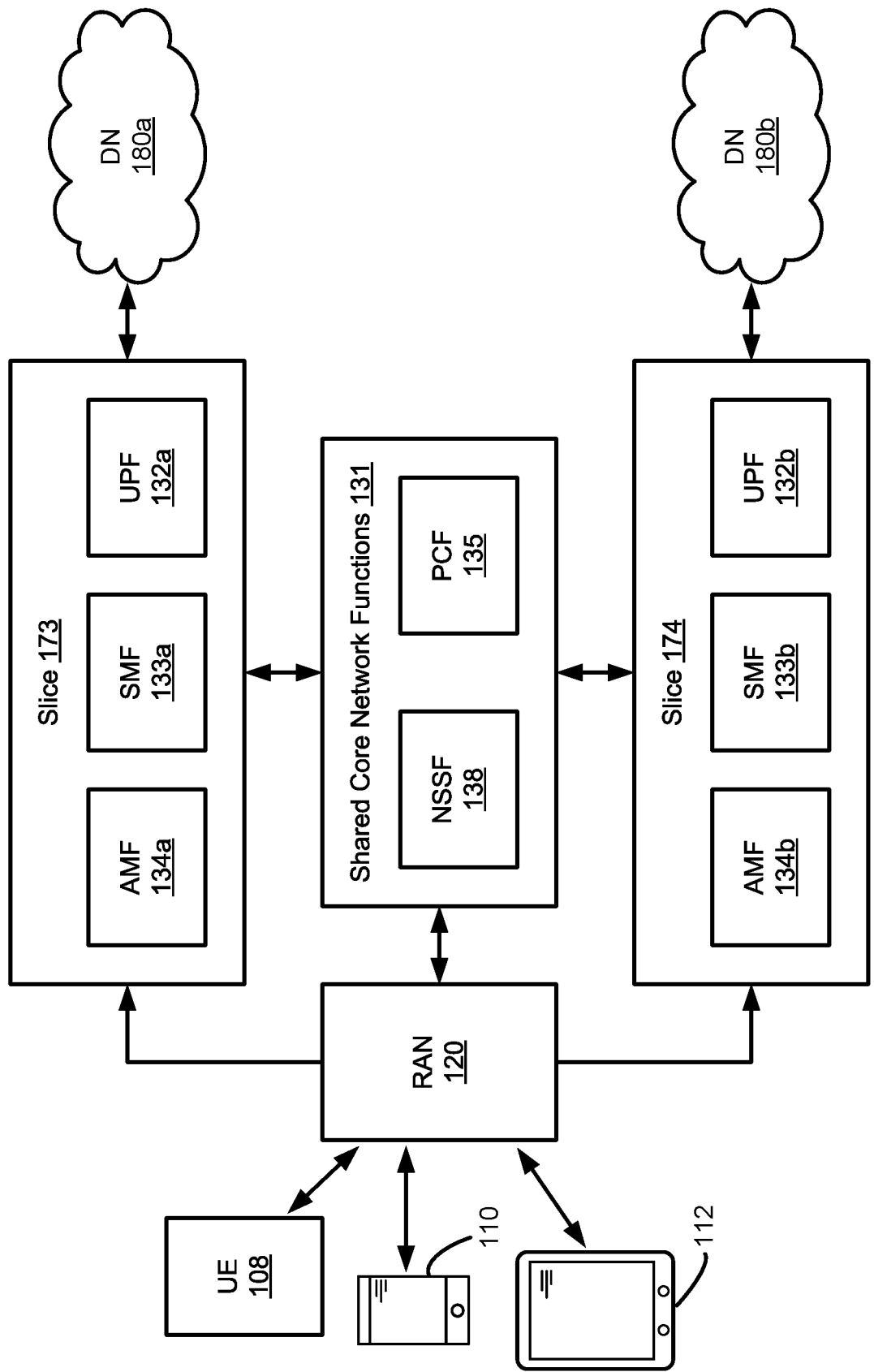
FIG. 3C depicts an embodiment of network slices after updates have been made based on changed to a network slice policy.

FIG. 3C depicts an embodiment of network slices 173 and 174 after updates have been made based on changes to a network slice policy or after reconfiguration of the network slices. As depicted, the network slices 173 and 174 share a set of shared core network functions 131 that includes PCF 135 and NSSF 138. Each network slice includes an AMF 134, an SMF 133, and a UPF 132.

Figure 4A:
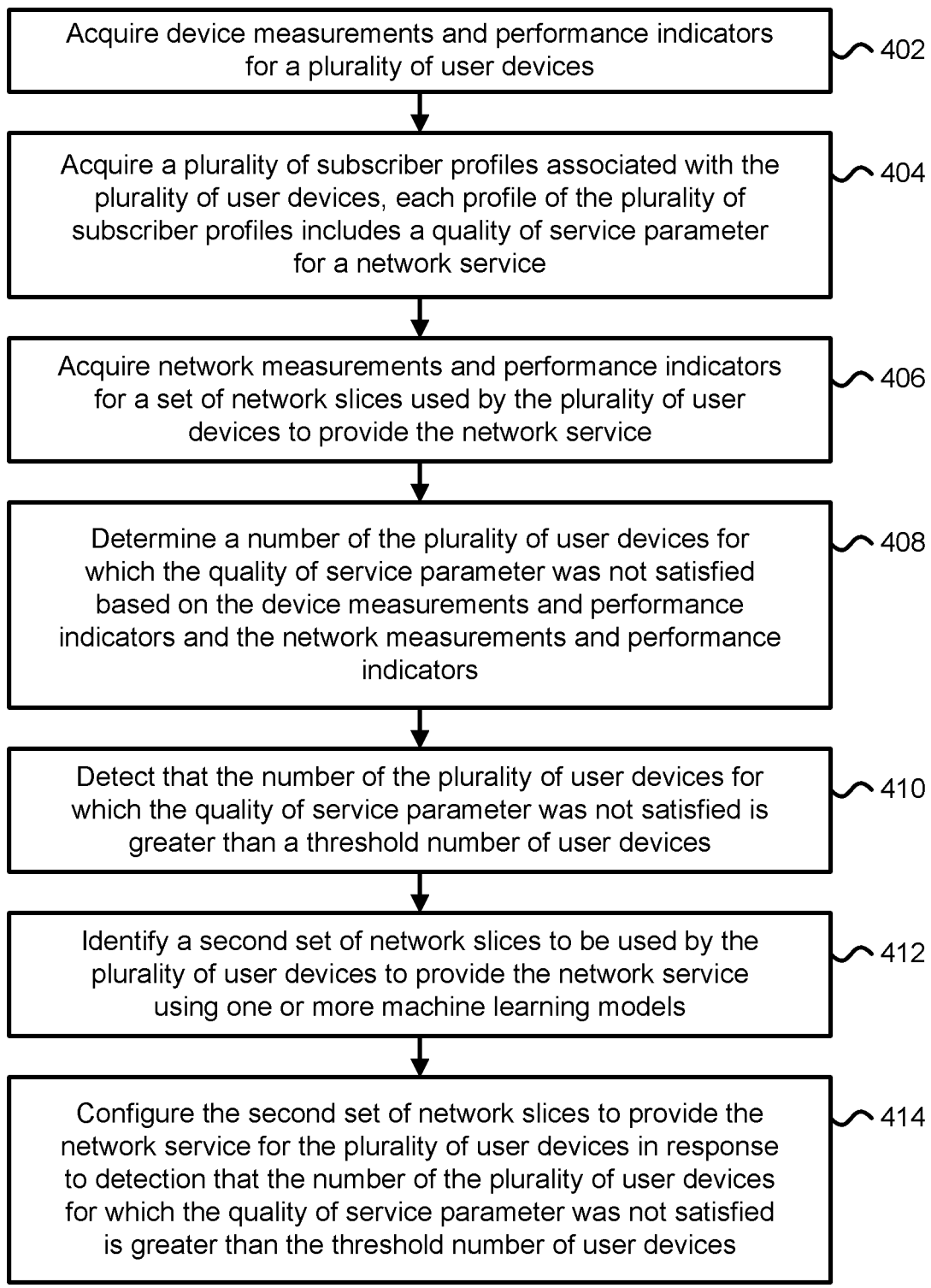
FIG. 4A depicts a flowchart describing an embodiment of a process for configuring network slices within a wireless networking environment.

FIG. 4A depicts a flowchart describing an embodiment of a process for configuring network slices within a wireless networking environment. In one embodiment, the process of FIG. 4A may be performed using one or more real or virtual machines and/or one or more containerized applications. In another embodiment, the process of FIG. 4A or portions thereof may be performed using a containerized environment, such as the containerized environment 279 in FIG. 2C. In another embodiment, the process of FIG. 4A or portions thereof may be performed using a network and service management system, such as the network and service management system in FIG. 1A.

In step 402, device measurements and performance indicators are acquired for a plurality of user devices. The plurality of user devices may comprise a plurality of UE devices operating within the wireless networking environment. The device measurements and performance indicators may include user device location tracking data, signal strength historical data, and traffic and mobility patterns data for UE devices. In step 404, a plurality of subscriber profiles associated with the plurality of user devices is acquired. Each profile of the plurality of subscriber profiles includes a quality of service parameter for a network service. The plurality of subscriber profiles may be acquired from a UDM of the wireless networking environment. The quality of service parameter may correspond with one or more SLA requirements for network slices. The quality of service parameter may be associated with a slice throughput for a network slice, an average download throughput for the network slice, a service uptime as a percentage of overall time for the network slice, or an average end-to-end latency for the network slice.

In step 406, network measurements and performance indicators for a set of network slices used by the plurality of user devices to provide the network service are acquired. The network measurements and performance indicators may include network performance data and link utilization data for the wireless networking environment. In step 408, a number of the plurality of user devices for which the quality of service parameter was not satisfied is determined based on the device measurements and performance indicators and/or the network measurements and performance indicators.

In step 410, it is detected that the number of the plurality of user devices for which the quality of service parameter was not satisfied is greater than a threshold number of user devices (e.g., was greater than twenty UE devices). In step 412, a second set of network slices to be used by the plurality of user devices to provide the network surface is identified using one or more machine learning models. The one or more machine learning models may correspond with the machine learning models 258 in FIG. 2A. In step 414, the second set of network slices to provide the network service for the plurality of user devices is configured or instantiated in response to detection that the number of the plurality of user devices for which the quality of service parameter was not satisfied is greater than the threshold number of user devices.

Figure 4B:
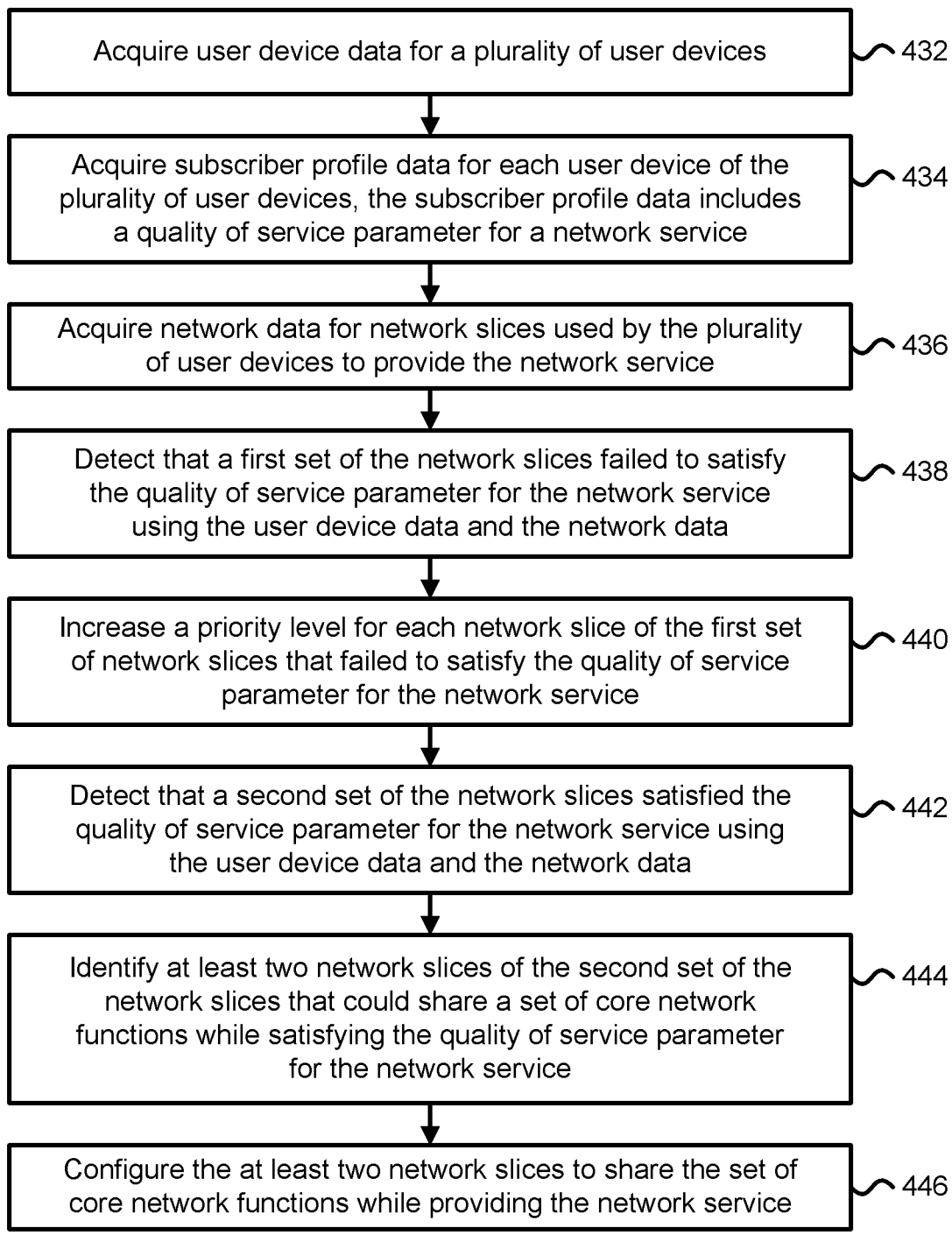
FIG. 4B depicts a flowchart describing another embodiment of a process for configuring network slices within a wireless networking environment.

FIG. 4B depicts a flowchart describing another embodiment of a process for configuring network slices within a wireless networking environment. In one embodiment, the process of FIG. 4B may be performed using one or more real or virtual machines and/or one or more containerized applications. In another embodiment, the process of FIG. 4B or portions thereof may be performed using a containerized environment, such as the containerized environment 279 in FIG. 2C. In another embodiment, the process of FIG. 4B or portions thereof may be performed using a network and service management system, such as the network and service management system in FIG. 1A.

In step 432, user device data for a plurality of user devices is acquired. The plurality of user devices may comprise a plurality of UE devices operating within the wireless networking environment. The user device data may include user device location tracking data, signal strength historical data, and traffic and mobility patterns data for UE devices in communication with the wireless networking environment. In step 434, subscriber profile data for each user device of the plurality of user devices is acquired. The subscriber profile data includes a quality of service parameter for a network service. The network service may comprise a cellular network service provided by the wireless networking environment. The subscriber profile data may be acquired from a UDM of the wireless networking environment, such as UDM 135 in FIG. 1E. In step 436, network data for network slices used by the plurality of user devices to provide the network service is acquired. The network data may include network performance data and link utilization data for the wireless networking environment.

In step 438, it is detected that a first set of the network slices failed to satisfy the quality of service parameter for the network service based on the user device data and the network data. The user device data and the network data may be stored within a database, such as the collector 194 in FIG. 1B. In one embodiment, it may be detected that each network slice of the first set of network slices failed to meet an end-to-end latency requirement. In another embodiment, it may be detected that each network slice of the first set of network slices failed to meet an average download throughput for network slices. In step 440, a priority level for each network slice of the first set of network slices that failed to satisfy the quality of service parameter for the network service is increased. The increase in the priority level may improve an end-to-end latency for one or more network slices of the first set of network slices.

In step 442, it is detected that a second set of the network slices satisfied the quality of service parameter for the network service based on the user device data and the network data. In one example, each network slice of the second set of the network slices satisfied an end-to-end latency requirement for network slices. In another example, each network slice of the second set of the network slices must satisfy an end-to-end latency requirement for network slices and have at least a threshold amount of timing margin to meet the end-to-end latency requirement for network slices (e.g., each network slice of the second set of the network slices has at least 0.5 ms of timing margin). In another example, each network slice of the second set of the network slices must satisfy a network slice throughput requirement for network slices (e.g., each network slice of the second set of the network slices has provided at least 5 gigabits per second during the past hour).

In step 444, at least two network slices of the second set of the network slices that could share a set of core network functions while satisfying the quality of service parameter for the network service are identified. In step 446, the at least two network slices are configured to share the set of core network functions while providing the network service. In one embodiment, the network slices 173 and 174 of FIGS. 3A-3C have been identified to share a set of core network functions, such as the shared core network functions 131 in FIG. 3B. In one example, the network slices 173 and 174 of FIGS. 3A-3C have been identified to share a set of core network functions as both network slices 173 and 174 met at least a threshold end-to-end latency during a past period of time (e.g., the past ten minutes).

At least one embodiment of the disclosed technology includes one or more processors configured to acquire device measurements and performance indicators for a plurality of user devices and acquire a plurality of subscriber profiles associated with the plurality of user devices. Each profile of the plurality of subscriber profiles includes a quality of service parameter for a network service. The one or more processors configured to acquire network measurements and performance indicators for a set of network slices used to provide the network service, determine a number of the plurality of user devices for which the quality of service parameter was not satisfied based on the device measurements and performance indicators and the network measurements and performance indicators, detect that the number of the plurality of user devices for which the quality of service parameter was not satisfied is greater than a threshold number of user devices, identify a second set of network slices to be used to provide the network service using one or more machine learning models, and configure the second set of network slices to provide the network service for the plurality of user devices in response to detection that the number of the plurality of user devices for which the quality of service parameter was not satisfied is greater than the threshold number of user devices.

At least one embodiment of the disclosed technology includes one or more processors configured to acquire user device data for a plurality of user devices and acquire subscriber profile data for the plurality of user devices. The subscriber profile data includes one or more quality of service parameters for a network service. The one or more processors configured to acquire network data for one or more network slices providing the network service, detect that a set of network slices out of the one or more network slices satisfied the one or more quality of service parameters for the network service based on the user device data and the network data, identify at least two network slices of the set of network slices that could share a set of core network functions in response to detection that the set of network slices satisfied the one or more quality of service parameters for the network service, and configure the at least two network slices to share the set of core network functions while the network service is provided.

At least one embodiment of the disclosed technology includes acquiring user device data from a plurality of user devices and acquiring subscriber profile data for the plurality of user devices. The subscriber profile data includes one or more quality of service parameters for a network service. The method further comprises acquiring network data for one or more network slices providing the network service, detecting that a set of network slices out of the one or more network slices satisfied the one or more quality of service parameters for the network service based on the user device data and the network data, identifying at least two network slices of the set of network slices that could share a set of core network functions in response to detecting that the set of network slices satisfied the one or more quality of service parameters for the network service, and configuring the at least two network slices to share the set of core network functions while the network service is provided.

The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each step in a flowchart may correspond with a program module or portion of computer program code, which may comprise one or more computer-executable instructions for implementing the specified functionality. In some implementations, the functionality noted within a step may occur out of the order noted in the figures. For example, two steps shown in succession may, in fact, be executed substantially concurrently, or the steps may sometimes be executed in the reverse order, depending upon the functionality involved. In some implementations, steps may be omitted and other steps added without departing from the spirit and scope of the present subject matter. In some implementations, the functionality noted within a step may be implemented using hardware, software, or a combination of hardware and software. As examples, the hardware may include microcontrollers, microprocessors, field programmable gate arrays (FPGAs), and electronic circuitry.

For purposes of this document, the term "processor" may refer to a real hardware processor or a virtual processor, unless expressly stated otherwise. A virtual machine may include one or more virtual hardware devices, such as a virtual processor and a virtual memory in communication with the virtual processor.

For purposes of this document, it should be noted that the dimensions of the various features depicted in the figures may not necessarily be drawn to scale.

For purposes of this document, reference in the specification to "an embodiment," "one embodiment," "some embodiments," "another embodiment," and other variations thereof may be used to describe various features, functions, or structures that are included in at least one or more embodiments and do not necessarily refer to the same embodiment unless the context clearly dictates otherwise.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify or distinguish separate objects.

For purposes of this document, the term "set" of objects may refer to a "set" of one or more of the objects.

For purposes of this document, the term "or" should be interpreted in the conjunctive and the disjunctive. A list of items linked with the conjunction "or" should not be read as requiring mutual exclusivity among the items, but rather should be read as "and/or" unless expressly stated otherwise. The terms "at least one," "one or more," and "and/or," as used herein, are open-ended expressions that are both conjunctive and disjunctive in operation. The phrase "A and/or B" covers embodiments having element A alone, element B alone, or elements A and B taken together. The phrase "at least one of A, B, and C" covers embodiments having element A alone, element B alone, element C alone, elements A and B together, elements A and C together, elements B and C together, or elements A, B, and C together. The indefinite articles "a" and "an," as used herein, should typically be interpreted to mean "at least one" or "one or more," unless expressly stated otherwise.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
one or more hardware processors configured to:
during a first time:
acquire first device measurements and performance indicators for a first plurality of user devices;
acquire first network measurements and performance indicators for a plurality of network slices used to provide a plurality of network services;
generate one or more machine learning models based on the first device measurements and performance indicators and the first network measurements and performance indicators for the plurality of network slices used to provide the plurality of network services;
during a second time:
acquire second device measurements and performance indicators for a second plurality of user devices;
acquire a plurality of subscriber profiles associated with the second plurality of user devices, each profile of the plurality of subscriber profiles includes a quality of service parameter for a network service of the plurality of network services;
acquire second network measurements and performance indicators for a set of network slices used to provide the network service to the second plurality of user devices;
determine a number of the second plurality of user devices for which the quality of service parameter was not satisfied based on the second device measurements and performance indicators and the second network measurements and performance indicators;
detect that the number of the plurality of user devices for which the quality of service parameter was not satisfied is greater than a threshold number of user devices;
in response to detection that the number of the plurality of user devices for which the quality of service parameter was not satisfied is greater than the threshold number of user devices, employ the one or more machine learning models to:
identify a second set of network slices to be used to provide the network service; and
configure the second set of network slices to provide the network service for the plurality of user devices by outputting instructions to one or more core network functions to replace the set of network slices with the second set of network slices to provide the network services.

2. The system of claim 1, wherein:
the one or more machine learning models include a deep learning model.

3. The system of claim 1, wherein:
the first and second device measurements and performance indicators include user device location tracking data;
the first and second network measurements and performance indicators include link utilization data; and
the network service comprises a cellular phone service.

4. The system of claim 1, wherein:
the quality of service parameter for the network service corresponds with a service level agreement requirement for the set of network slices.

5. A system, comprising:
one or more hardware processors configured to:
   acquire user device data for a plurality of user devices;
   acquire subscriber profile data for the plurality of user devices, the subscriber profile data includes one or more quality of service parameters for a network service;
   acquire network data for one or more network slices providing the network service;
   detect that a set of network slices out of the one or more network slices satisfied the one or more quality of service parameters for the network service based on the user device data and the network data;
   in response to detection that the set of network slices satisfied the one or more quality of service parameters for the network service, employ at least one artificial intelligence mechanism to:
      identify at least two network slices of the set of network slices that could share a set of core network functions; and
      output instructions to the set of core network functions to configure the at least two network slices to share the set of core network functions while the network service is provided.

6. The system of claim 5, wherein:
the one or more hardware processors are configured to detect that each network slice of the set of network slices satisfied a network slice throughput requirement for the set of network slices.

7. The system of claim 5, wherein:
the one or more hardware processors are configured to detect that each network slice of the set of network slices satisfied an end-to-end latency requirement for the set of network slices.

8. The system of claim 5, wherein:
the one or more hardware processors are configured to detect that each network slice of the set of network slices satisfied an end-to-end latency requirement for the set of network slices and had at least a threshold amount of timing margin to meet the end-to-end latency requirement for the set of network slices.

9. The system of claim 5, wherein:
the set of core network functions includes an access and mobility management function.

10. The system of claim 5, wherein:
the one or more hardware processors are configured to identify the at least two network slices of the set of network slices in response to detection that each network slice of the at least two network slices met a threshold end-to-end latency requirement.

11. The system of claim 5, wherein:
the one or more hardware processors are configured to detect that a first network slice has failed to satisfy a quality of service parameter for the first network slice and adjust a priority level for the first network slice in response to detection that the first network slice has failed to satisfy the quality of service parameter for the first network slice.

12. The system of claim 5, wherein:
the user device data includes user device location tracking data;
the network data includes link utilization data; and
the network service comprises a cellular phone service.

13. A method, comprising:
training one or more machine learning models on training device measurements and performance indicators and training network measurements and performance indicators for a plurality of network slices used to provide a plurality of network services;
acquiring user device data from a plurality of user devices;
acquiring subscriber profile data for the plurality of user devices, the subscriber profile data includes one or more quality of service parameters for a network service of the plurality of network services;
acquiring network data for one or more network slices providing the network service;
detecting that a set of network slices out of the one or more network slices satisfied the one or more quality of service parameters for the network service based on the user device data and the network data;
employing the one or more machine learning models, including:
   identifying at least two network slices of the set of network slices that could share a set of core network functions in response to detecting that the set of network slices satisfied the one or more quality of service parameters for the network service; and
   configuring the at least two network slices to share the set of core network functions while the network service is provided.

14. The method of claim 13, wherein:
the detecting that the set of network slices satisfied the one or more quality of service parameters for the network service includes detecting that each network slice of the set of network slices satisfied a network slice throughput requirement for the set of network slices.

15. The method of claim 13, wherein:
the detecting that the set of network slices satisfied the one or more quality of service parameters for the network service includes detecting that each network slice of the set of network slices satisfied an end-to-end latency requirement for the set of network slices.

16. The method of claim 13, wherein:
the detecting that the set of network slices satisfied the one or more quality of service parameters for the network service includes detecting that each network slice of the set of network slices satisfied an end-to-end latency requirement for the set of network slices and had at least a threshold amount of timing margin to meet the end-to-end latency requirement for the set of network slices.

17. The method of claim 13, wherein:
the user device data includes user device location tracking data; and
the network data includes link utilization data.

18. The method of claim 13, wherein:
the set of core network functions includes an access and mobility management function.

19. The method of claim 13, further comprising:
detecting that a first network slice has failed to satisfy a quality of service parameter for the first network slice; and
increasing a priority level for the first network slice in response to detecting that the first network slice has failed to satisfy the quality of service parameter for the first network slice.

* * * * *